(12) United States Patent
Ali et al.

(10) Patent No.: US 10,726,281 B2
(45) Date of Patent: Jul. 28, 2020

(54) METHOD AND APPARATUS FOR USER AND MOVING VEHICLE DETECTION

(71) Applicant: Invensense, Inc., San Jose, CA (US)

(72) Inventors: Abdelrahman Ali, Calgary (CA); Mostafa Elhoushi, Calgary (CA); Jacques Georgy, Calgary (CA); Christopher Goodall, Calgary (CA); Ardalan Heshmati, San Jose, CA (US); Michael D. Housholder, San Jose, CA (US)

(73) Assignee: InvenSense, Inc., San Jose, CA (US)

(\*) Notice: Subject to any disclaimer, the term of this patent is extended or adjusted under 35 U.S.C. 154(b) by 184 days.

(21) Appl. No.: 14/812,411

(22) Filed: Jul. 29, 2015

(65) Prior Publication Data
US 2017/0030716 A1    Feb. 2, 2017

(51) Int. Cl.
| | | |
|---|---|---|
| *G06K 9/00* | (2006.01) | |
| *G01S 19/42* | (2010.01) | |
| *G06T 7/13* | (2017.01) | |
| *B60W 50/14* | (2020.01) | |
| *G06K 9/46* | (2006.01) | |
| *G06T 7/246* | (2017.01) | |
| *B60W 30/08* | (2012.01) | |
| *G06K 9/62* | (2006.01) | |

(52) U.S. Cl.
CPC ......... *G06K 9/00845* (2013.01); *B60W 30/08* (2013.01); *B60W 50/14* (2013.01); *G01S 19/42* (2013.01); *G06K 9/00355* (2013.01); *G06K 9/00362* (2013.01); *G06K 9/4604* (2013.01); *G06K 9/629* (2013.01); *G06T 7/13* (2017.01); *G06T 7/246* (2017.01); *G06K 2009/6295* (2013.01)

(58) Field of Classification Search
CPC .......... G06K 9/00845; G06K 9/00355; G06K 9/00362; G06K 9/4604; G06K 9/629; B60W 50/14; B60W 30/08
See application file for complete search history.

(56) References Cited

U.S. PATENT DOCUMENTS

| | | | |
|---|---|---|---|
| 9,467,817 B1 * | 10/2016 | Van Wiemeersch | ......................... H04W 4/046 |
| 9,888,392 B1 * | 2/2018 | Snyder | .................. H04W 4/027 |
| 2009/0119296 A1 * | 5/2009 | Neogi | .................. G06K 9/6885 |
| 2010/0174487 A1 * | 7/2010 | Soehren | ................. G01C 21/20 |
| | | | 701/500 |
| 2010/0283832 A1 * | 11/2010 | Lin | ...................... G06K 9/3216 |
| | | | 348/46 |

(Continued)

*Primary Examiner* — Donald J Wallace
(74) *Attorney, Agent, or Firm* — Bay Area Technology Law Group; Nathan Koenig

(57) ABSTRACT

An apparatus and method are disclosed for user and moving vehicle detection in which sensor data for a portable device is processed to determine whether the portable device is in a moving vehicle. Following a determination the portable device is in a moving vehicle, the sensor data is to characterize an association between the user and the portable device to determine whether the portable device is connected to the user. If the user is connected to the portable device, it is then determined if the portable device is being held in hand. If the portable device is held in hand, it is then determined if the user is operating the moving vehicle. Output from an image sensor of the portable device may be used in determining if the user is the operator.

57 Claims, 15 Drawing Sheets

(56) References Cited

U.S. PATENT DOCUMENTS

| | | | | |
|---|---|---|---|---|
| 2011/0093250 A1* | 4/2011 | Lin | ............... | G01C 19/38 |
| | | | | 703/7 |
| 2011/0143816 A1* | 6/2011 | Fischer | ............... | G08G 1/16 |
| | | | | 455/566 |
| 2011/0148623 A1* | 6/2011 | Bishop | ............... | G01C 21/20 |
| | | | | 340/539.13 |
| 2011/0304446 A1* | 12/2011 | Basson | ............... | B60K 28/063 |
| | | | | 340/438 |
| 2013/0205306 A1* | 8/2013 | Kelly | ............... | G06F 9/542 |
| | | | | 719/318 |
| 2013/0297203 A1* | 11/2013 | Kelly | ............... | G01C 21/18 |
| | | | | 701/454 |
| 2014/0379207 A1* | 12/2014 | Katsman | ............... | G01C 21/165 |
| | | | | 701/33.2 |
| 2015/0019266 A1* | 1/2015 | Stempora | ............... | G06Q 40/08 |
| | | | | 705/4 |
| 2015/0228191 A1* | 8/2015 | Steinmetz | ............... | G08G 1/0968 |
| | | | | 340/988 |
| 2015/0327034 A1* | 11/2015 | Abramson | ............... | H04L 67/12 |
| | | | | 455/419 |
| 2015/0351071 A1* | 12/2015 | Pandey | ............... | H04W 64/003 |
| | | | | 455/456.1 |
| 2016/0071395 A1* | 3/2016 | Demeniuk | ............... | G08C 17/02 |
| | | | | 340/686.1 |
| 2016/0088422 A1* | 3/2016 | Foster | ............... | G01S 5/0263 |
| | | | | 455/41.2 |
| 2016/0146947 A1* | 5/2016 | Davies | ............... | G01S 19/09 |
| | | | | 342/357.46 |
| 2016/0248904 A1* | 8/2016 | Duvaut | ............... | H04M 1/72577 |
| 2016/0328029 A1* | 11/2016 | March | ............... | G06F 3/0346 |
| 2016/0335817 A1* | 11/2016 | Hatton | ............... | G07C 5/008 |

\* cited by examiner

Left to Right    Right to Left

METHOD AND APPARATUS FOR USER AND MOVING VEHICLE DETECTION

FIELD OF THE PRESENT DISCLOSURE

This disclosure generally relates to detecting whether a portable device is in a moving vehicle and characterizing an association between the portable device and a user. The disclosure further relates to determining whether the user is operating the moving vehicle.

BACKGROUND

Portable electronic devices, such as those configured to be handheld or otherwise associated with a user, are employed in a wide variety of applications and environments. The ubiquity of such devices as mobile phones, wearables, including smart watches and glasses, digital still cameras and video cameras, handheld music and media players, portable video game devices and controllers, tablets, mobile internet devices (MIDs), personal navigation devices (PNDs), other APPlication acCESSORIES (or Appcessories for short) and other similar devices speaks the popularity and desire fir these types of devices. Increasingly, such devices are equipped with one or more sensors or other systems for determining the position or motion of the portable device with increasing sophistication and accuracy. Likewise, additional sensing capabilities are commonly available in the form of proximity and ambient light sensors, image sensors, barometers, magnetometers and the like. Still further, such portable devices often feature navigation systems, such as a Global Navigation Satellite Systems (GNSS), that enable precise determinations regarding geophysical position and movement. Corresponding advances in computation power, size, power consumption and prices make such portable devices powerful computing tools with extensive capabilities to detect their environment.

Given the noted popularity in portable devices having some or all of these capabilities, the user of such a portable device is typically associated with it to varying degrees throughout the course of the day. The user may be holding the portable device in hand, and further may be employing it for one of its functions such as phoning, texting, viewing, photographing, playing games or any of a wide variety of other applications. Alternatively, the user may also be carrying the portable device in a pocket, a holster, a purse, a backpack, or in any other manner that creates some type of physical connection with the user. Yet another possibility is that the portable device is in the possession of the user, but not physically connected, such as when the device is resting on a nearby surface or deposited in a holder.

However, even though the portable device may be associated with the user, there are circumstances during which it would be undesirable for the user to have certain types of interactions with the portable device. For example, when the user is operating a moving vehicle, safety may be compromised if the user was interacting with the portable device in a manner that required manual input and/or unduly distracted from the moving vehicle operation. Indeed, a number of jurisdictions have enacted "hands-free" laws that prohibit holding portable devices while driving.

Correspondingly, there is a need for techniques to determine whether a portable device is in a moving vehicle. Further, there is a need for techniques to determine how the portable device is associated with the user, and in particular, to determine whether the portable device is being held in the hand. Still further, there is a need for techniques to determine whether the user is operating the moving vehicle once it is determined the portable device is hand held and in a moving vehicle. It would be desirable to leverage the noted capabilities of the portable device for performing these determinations. In turn, the information about the user's association with the portable device and whether the user is operating the moving vehicle may be used for a number of purposes. For example, the portable device may warn the user when an unsafe association is detected and/or the user's behavior may be analyzed for entities such as insurance companies or employers for users whom operating moving vehicles is part of the job. As will be described in the following materials, this disclosure satisfies these and other needs.

SUMMARY

As will be described in detail below, this disclosure includes a method for user and moving vehicle detection. The method may involve obtaining sensor data for a portable device, processing the sensor data to determine whether the portable device is in a moving vehicle and processing the sensor data to determine whether the portable device is connected to a user if it is determined that the portable device is in the moving vehicle.

This disclosure also include a portable device for providing user and moving vehicle detection. The portable device may have a sensor assembly integrated with the portable device that is configured to output data representing motion of the portable device, a processor configured to process the sensor data and a detector configured to process the sensor data to determine whether the portable device is in a moving vehicle and process the sensor data to determine whether the portable device is connected to a user if it is determined that the portable device is in the moving vehicle.

DETAILED DESCRIPTION

Figure 1:
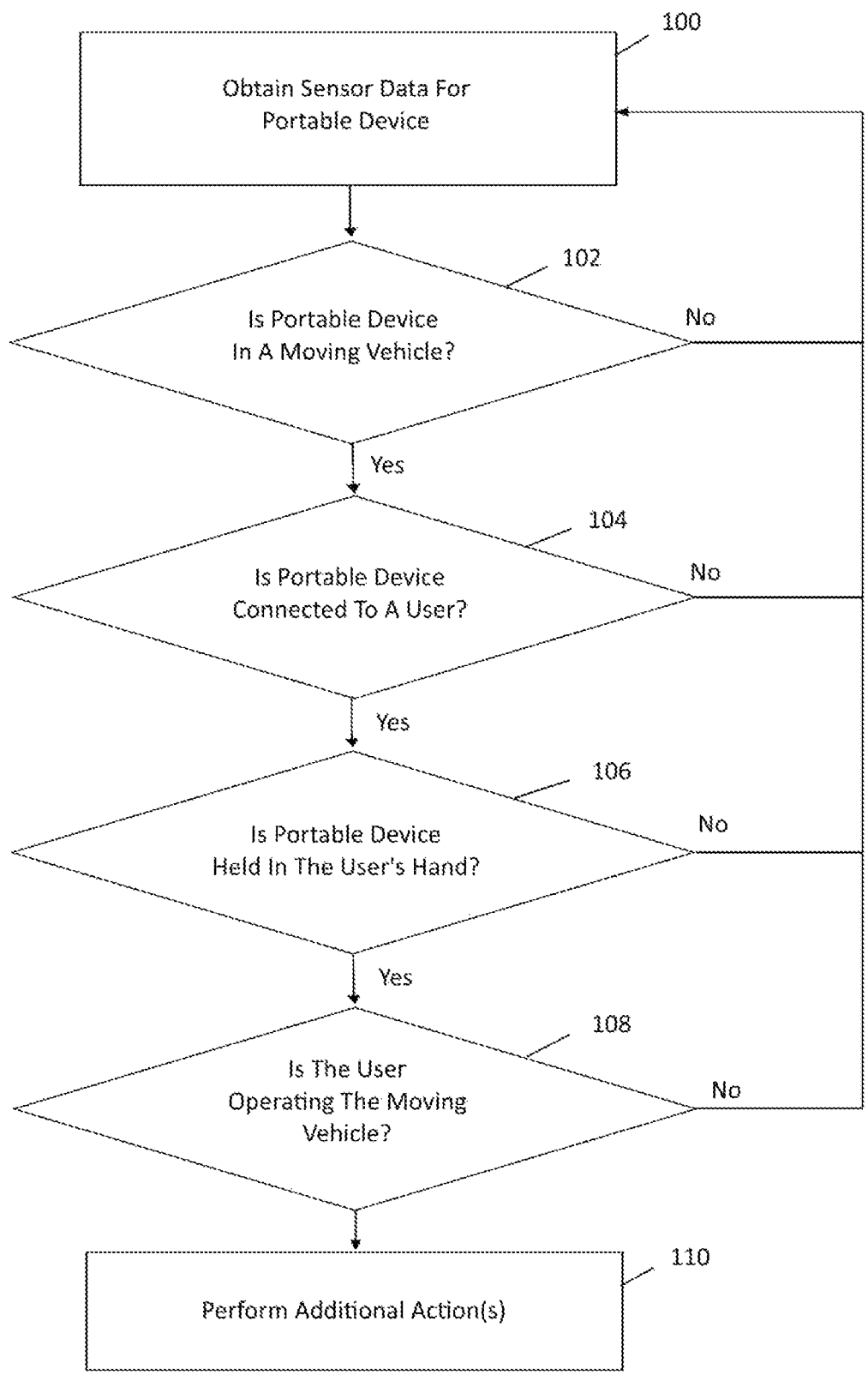
FIG. 1 is a flowchart showing a routine for user and moving vehicle detection according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, of similar electronic computing device, that manipulates and transforms data represented as physical (electronic) quantities within the computer system's registers and memories into other data similarly represented as physical quantities within the computer system memories or registers or other such information storage, transmission of display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary portable devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or More microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

As noted above, public policy and safety concerns may make it desirable to restrict and/or gather information about whether a user is simultaneously holding a portable device while operating a moving vehicle. Due to the increasing popularity of portable devices, it is typical for a user to have a portable device associated with them when in a moving vehicle. However, the user either may be operating the moving vehicle or a passenger. For the purposes of this disclosure, the term "passenger" refers to any person other than the operator who is in the moving vehicle. Since interacting with a portable device, such as by Internet surfing, texting, viewing, capturing images, making/receiving calls or other functions involving the portable device may increase the chance of distracting the user from proper and safe operation of the moving vehicle, it is desirable to determine whether the user associated with the portable device is an operator or a passenger.

Correspondingly, this disclosure generally relates to detecting whether a portable device is in a moving vehicle and characterizing the association between the portable device and a user. Depending on the association, it may also be determined whether the portable device is being held in the user's hand and, if so, whether the user is operating the moving vehicle.

To help illustrate the techniques of this disclosure, FIG. 1 depicts an exemplary routine for user and moving vehicle detection. Beginning with 100, sensor data may be obtained for a portable device. In one aspect, the sensor data may be inertial sensor data from one or more accelerometers, gyroscopes or other suitable motion and/or orientation detection sensors. In 102, the sensor data may be processed to determine whether the portable device is in a moving vehicle. If not, it may be assumed that the user of the portable device is not currently operating a moving vehicle and the routine may return to 100 so that obtaining the sensor data is ongoing in case circumstances change. Otherwise, the routine continues to 104 and the sensor data may be used to characterize an association between the user and the portable device by determining whether the portable device is connected to the user. As will be appreciated, the portable device may be physically connected to the user by being held and/or manipulated by the user or in a pocket, belt clip, holster, or container that is secured to the user. Alternatively, the portable device may still be associated with the user, but not physically connected, such as when the portable device is mounted to the moving vehicle (e.g., dash, windshield, arm rest, and the like) or simply resting on a nearby surface. If it is determined in 104 that the portable device is not connected to the user, it may be assumed that the user is not holding the portable device and the routine may return to 100, again to monitor for changing circumstances.

However, when it is determined the portable device is connected to the user, the routine may continue to 106 to determine whether the portable device is held in the user's hand. The portable device may be held in a number of contexts, including on the user's ear when making a phone call or in front of the user, such as in a landscape or portrait orientation, when texting, viewing or the like. Other hand held contexts may also be detected according to the techniques of this disclosure. In one aspect, supplemental information may be obtained to facilitate the determination of whether the portable device is being held in hand. For example, additional motion or inertial sensor data may be obtained. Alternatively or in addition, data from one or more other sensors may also be obtained, such as ambient light, proximity and/or image sensors. Still further, the supplemental information may come from other components of the portable device and may include an indication of functions or applications running on the portable device.

If the determination in 106 concludes that the portable device is not being hand held, the routine may return to 100 as described above. Otherwise, the routine continues to 108 where it may be determined whether the user is operating the moving vehicle. In one aspect, supplemental information may be obtained to facilitate this determination. The supplemental information may be from any of the sources noted above. For example, image sensor data may be obtained to determine the user's orientation with respect to the interior of the moving vehicle and/or component(s) of the moving vehicle to determine whether the user is operating the vehicle. Further, in this context, the supplemental information may include location information for the portable device to ascertain the expected orientation of an operator of the moving vehicle, such as whether the operator may be assumed to be positioned on the right or left of the vehicle. If it is determined the user is not operating the moving vehicle, the routine may return to 100 as before. Otherwise the routine in FIG. 1 may culminate in 110, having positively detected that the user is operating the moving vehicle while holding the portable device. As indicated, one or more desired actions may be performed, including for example warning the user not to hold the portable device in hand while operating the moving vehicle. Alternatively or in addition, the positive detection may be stored or transmitted for analysis of the user's behavior.

As will be appreciated, the sequential determinations that may be made in the routine of FIG. 1 allow resources to be conserved, improving the efficiency of the process. For example, obtaining supplemental sensor data or other information may require activation of additional components of the portable device and/or expenditure of processing cycles and power. Thus, the aspects associated with 106 and subsequently 108 need not be performed if the determinations in 102 and/or 104 preclude the possibility that the portable device is in a moving vehicle or that the portable device is connected to the user.

Figure 2:
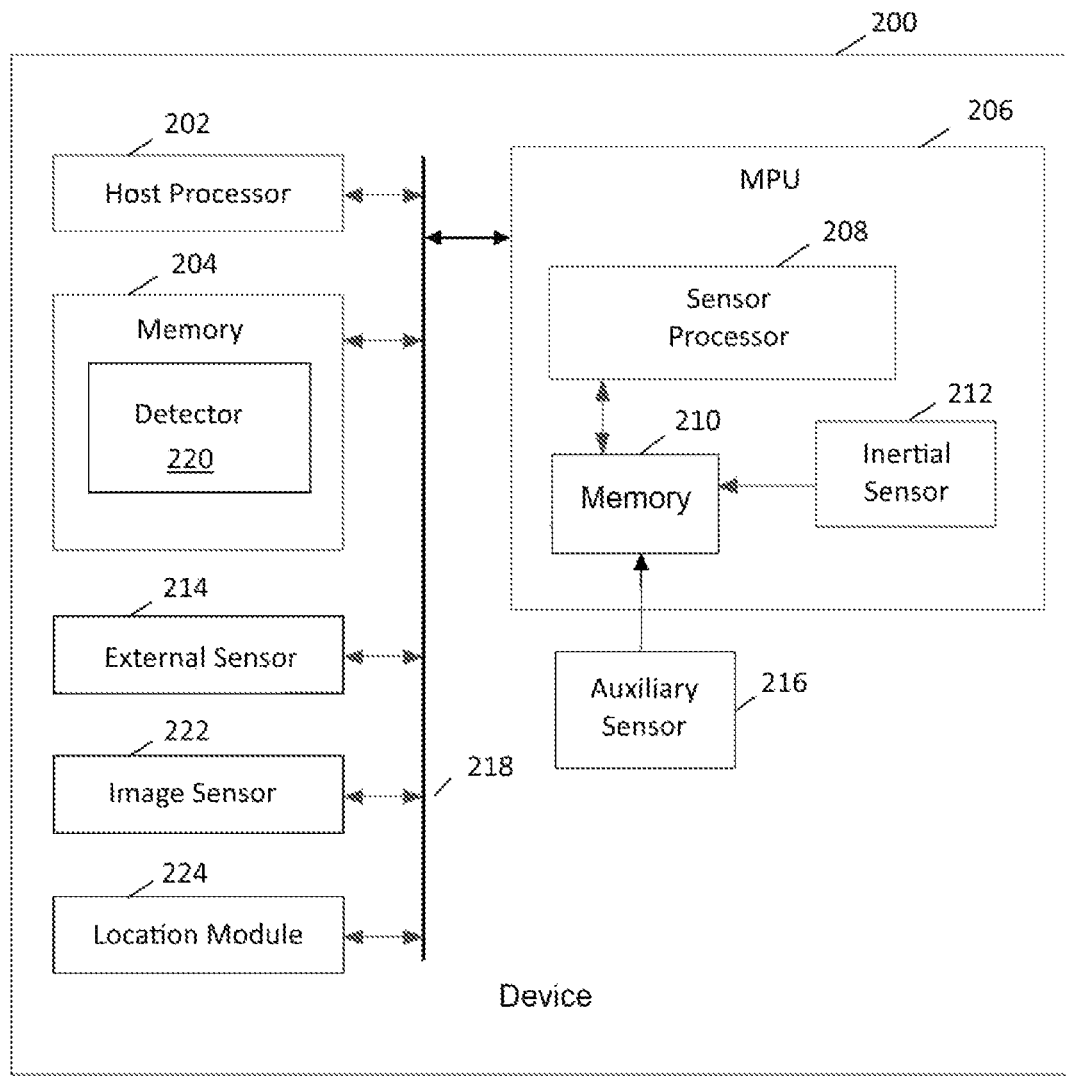
FIG. 2 is schematic diagram of a portable device for user and moving vehicle detection according to an embodiment.

As noted above, the portable device may include a sensor assembly including inertial motion sensors providing measurements that may be used in performing the user and moving vehicle detection. To help illustrate these features, a representative portable device 200 is depicted in FIG. 2 with high level schematic blocks. As will be appreciated, device 200 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 200 includes a host processor 202, which may be one or more microprocessors, central processing units (CPUs), or other processors to run software programs, which may be stored in memory 204, associated with the functions of device 200. Multiple layers of software can be provided in memory 204, which may be any combination of computer readable medium such as electronic memory or other storage medium such as hard disk, optical disk, etc., for use with the host processor 202. For example, an operating system layer can be provided for device 200 to control and manage system resources in real time, enable functions of application software and other layers, and interface application programs with other software and functions of device 200. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 200, and in some of those embodiments, multiple applications can run simultaneously.

Device 200 includes at least one sensor assembly, as shown here in the form of integrated motion processing unit (MPU™) 206 featuring sensor processor 208, memory 210 and inertial sensor 212. Memory 210 may store algorithms, routines or other instructions for processing data output by inertial sensor 212 and/or other sensors as described below using logic or controllers of sensor processor 208, as well as storing raw data and/or motion data output by inertial sensor 212 or other sensors. Inertial sensor 212 may be one or more sensors for measuring motion of device 200 in space. Depending on the configuration, MPU 206 measures one or more axes of rotation and/or one or more axes of acceleration of the device. In one embodiment, inertial sensor 212 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 208, or other processing resources of device 200, combines data from inertial sensor 212 to provide a six axis determination of motion. As desired, inertial sensor 212 may be implemented using Micro Electro Mechanical System (MEMS) to be integrated with MPU 206 in a single package. Exemplary details regarding suitable configurations of host processor 202 and MPU 206 may be found in co-pending, commonly owned U.S. patent application Ser. No. 21/774,488, filed Jul. 6, 2007, and Ser. No. 22/106,921, filed Apr. 21, 2008, which are hereby incorporated by reference in their entirety. Suitable implementations for MPU 206 in device 200 are available from InvenSense, Inc. of Sunnyvale, Calif.

Alternatively, addition, device 200 may implement a sensor assembly in the form of external sensor 214. External sensor 214 may represent one or more motion sensors as described above, such as an accelerometer and/or a gyroscope, that outputs data for categorizing, recognizing, classifying or otherwise determining device use case. As used herein, "external" means a sensor that is not integrated with MPU 206. In one aspect, external sensor 214 may represent one or more acoustic, infrared, ultrasonic, radio frequency, proximity and/or ambient light sensors. Also alternatively or in addition, MPU 206 may receive data from an auxiliary sensor 216 configured to measure one or more aspects about the environment surrounding device 200. For example, a barometer and/or a magnetometer may be used to refine position determinations made using inertial sensor 212. In one embodiment, auxiliary sensor 216 may include a magnetometer measuring along three orthogonal axes and output data to be fused with the gyroscope and accelerometer inertial sensor data to provide a nine axis determination of motion. In another embodiment, auxiliary sensor 216 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 202, memory 204, MPU 206 and other components of device 200 may be coupled through bus 218, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 200, such as by using a dedicated bus between host processor 202 and memory 204.

In one aspect, the various operations of this disclosure for user and moving vehicle detection may be implemented through detector 220 as a set of suitable instructions stored in memory 204 that may be read and executed by host processor 202. Other embodiments may feature any desired division of processing between host processor 202, MPU 206 and other resources provided by device 200, or may be implemented using any desired combination of software, hardware and firmware.

Multiple layers of software may be employed as desired and stored in any combination of memory 204, memory 210, or other suitable location. For example, a motion algorithm layer can provide motion algorithms that provide lower-level processing for raw sensor data provided from the motion sensors and other sensors. A sensor device driver layer may provide a software interface to the hardware sensors of device 200. Further, a suitable application program interface (API) may be provided to facilitate communication between host processor 202 and MPU 206, for example, to transmit desired sensor processing tasks. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 202, sensor processor 208, a dedicated processor or any other processing resources of device 200.

As will be described below, image sensor data may be used for aspects of this disclosure, including the determination of whether the user is operating the moving vehicle, such as by identifying feature(s) in a digital image or a sequence of digital images (e.g., video). Correspondingly, device 200 may include image sensor 222, which may represent one or more optical sensors for capturing images and may be implemented as front-facing cameras, rear-facing cameras or both, for example.

Device 200 may also include location module 224 that provides any desired degree of location awareness capabilities. In one aspect, this may include a reference-based wireless system providing a source of absolute location information for device 200. Representative technologies that may be embodied by location module 224 include: (i) global navigation satellite system (GNSS) receiver such as global positioning system (UPS), GLONASS, Galileo and Beidou, or any other GNSS, as well as (ii) WiFi™ positioning, (iii) cellular tower positioning, (iv) other wireless communication system-based positioning or other similar methods.

As described above, the present disclosure relates to a method for user and moving vehicle detection using sensor data.

In one aspect, the sensor data may be processed to determine whether the portable device is in a moving vehicle by applying a machine learning technique, which may involve inputting features extracted from the processed sensor data to at least one stored classification model to determine a motion mode of the portable device. The stored classification model may include extracted features developed during a training phase.

In one aspect, the sensor data may be processed to determine whether the portable device is in a moving vehicle comprises applying a signal analysis technique, which may include any one or any combination of the following: (i) a statistical analysis; (ii) a frequency-domain analysis; or (iii) a time-domain analysis. Further, the signal analysis technique may include an analysis of at least one signal selected from the group consisting of an angular rotation signal, a signal derived from the angular rotation signal, an acceleration signal, and a signal derived from the acceleration signal.

In one aspect, the sensor data may be inertial sensor data. Further, supplemental sensor data may be obtained for the portable device and may be processed with the inertial sensor data.

In one aspect, absolute navigational information may be obtained for the portable device and used in determining if the portable device is in a moving vehicle.

In one aspect, the sensor data may be processed to determine whether the portable device is connected to the user by applying a machine learning technique, which may involve inputting features extracted from the processed sensor data to at least one stored classification model to characterize if the portable device is connected to the user. The stored classification model may include extracted features developed during a training phase.

In one aspect, the sensor data may be processed to determine whether the portable device is connected to the user by applying a signal analysis technique, which may include any one or any combination of the following: (i) a statistical analysis; (ii) a frequency-domain analysis; or (iii) a time-domain analysis. Further, the signal analysis technique may include an analysis of at least one signal selected from the group consisting of an angular rotation signal, a signal derived from the angular rotation signal, an acceleration signal, and a signal derived from the acceleration signal.

In one aspect, the sensor data may be processed to determine whether the portable device is hand held if it is determined the portable device is connected to the user.

In one aspect, determining whether the portable device is hand held may include determining a device use case for the portable device.

In one aspect, the sensor data may be processed to determine whether the portable device is hand held by applying a machine learning technique, which may involve inputting features extracted from the processed sensor data to at least one stored classification model to characterize an association between the portable device and the user. The stored classification model may include extracted features developed during a training phase.

In one aspect, the sensor data may be processed to determine whether the portable device is hand held by applying a signal analysis technique, which may include any one or any combination of the following: (i) a statistical analysis; (ii) a frequency-domain analysis; or (iii) a time-domain analysis. Further, the signal analysis technique may include an analysis of at least one signal selected from the group consisting of an angular rotation signal, a signal derived from the angular rotation signal, an acceleration signal, and a signal derived from the acceleration signal.

In one aspect, the sensor data processed to determine if the device is hand held may be inertial sensor data. Further, supplemental sensor data may be obtained and used to determine whether the portable device is hand held. For example, the supplemental sensor data may be from an ambient light sensor or a proximity sensor. Further, a source of the supplemental sensor data may be activated from a power save mode if it is determined the portable device is connected to the user.

In one aspect, information regarding the portable device may be obtained and used to determine whether the portable device is hand held. For example, the information regarding the portable device may be a status of at least one application running on the portable device.

In one aspect, image sensor data for the portable device may be obtained if it is determined the portable device is hand held and processed to determine whether the user of the portable device is operating the moving vehicle. For example, processing the image sensor data may include extracting a feature and/or an object from the image sensor data. Further, the image sensor data may be preprocessed before extraction. Preprocessing the image may include generating a full color image, generating a reduced dimension image, generating a grey scale image, generating a resized image, generating a normalized image, and/or generating a reduced noise image.

In one aspect, the extraction may include a line detection operation, an edge detection operation, a circular shape detection operation and/or performing a Hough transform.

In one aspect, processing the image sensor data may include recognizing a feature and/or an object. The feature and/or object may be associated with the user, and may be a head, a face or shoulders. Alternatively or in addition, the feature and/or object may be associated with the vehicle, such as a steering wheel, a mirror, a seat belt, a windshield and a window. A combination of objects associated with the user and the vehicle may be recognized.

In one aspect, obtaining image sensor data may include activating an image sensor of the portable device from a power save mode.

In one aspect, the image sensor data may be obtained from multiple image sensors of the portable device.

In one aspect, a coarse location may be obtained for the portable device and used to determine an expected orientation of a vehicle operator with respect to the vehicle, such that determining whether the user of the portable device is operating the moving vehicle may be based at least in part on the expected vehicle operator orientation. The coarse location may be obtained from any one or any combination of the following: (i) a global navigation satellite system (GNSS); (ii) cell-based positioning; (iii) WiFi-based positioning; or (iv) other wireless-based positioning.

As noted, the disclosure also includes a portable device for providing user and moving vehicle detection with a detector configured to process sensor data to determine whether the portable device is in a moving vehicle and process sensor data to determine whether the portable device is connected to a user if it is determined that the portable device is in the moving vehicle.

In one aspect, the detector may be further configured to process the sensor data to determine whether the portable device is hand held if it is determined that the portable device is connected to the user.

In one aspect, the sensor assembly may include an inertial sensor. Further, the device may also include a supplemental sensor, such as an ambient light sensor or a proximity sensor, and the defector may be configured to determine whether the portable device is hand held based at least in part on output from the supplemental sensor.

In one aspect, the device may include an image sensor and the detector may be configured to process image sensor data to determine whether the user of the portable device is operating the moving vehicle.

In one aspect, the device may include a location module configured to obtain a coarse location for the portable device and the detector may be configured to determine whether the user of the portable device is operating the moving vehicle based at least in part an expected orientation of a vehicle operator with respect to the vehicle based on the coarse location. The location module may be a source of absolute navigational information from any one or any combination of the following: (i) a global navigation satellite system (GNSS) receiver; (ii) cell-based positioning receiver; (iii) WiFi-based positioning receiver; or (iv) other wireless-based positioning receiver.

In one aspect, the sensor assembly may include an accelerometer and a gyroscope. For example, the sensor assembly may include an inertial sensor implemented as a Micro Electro Mechanical System (MEMS).

EXAMPLES

As described above, the techniques of the disclosure may involve user and moving vehicle detection to make a series of determinations, including whether a portable device is in a moving vehicle. If so, it may then be determined whether the portable device is connected to a user. Following a positive determination that the portable device is connected to the user, it may then be determined whether the user is holding the portable device in hand. Consequently, if the portable device is in hand, it may be determined whether the user is operating the moving vehicle. These determinations may be made from sensor data indicating motion of the portable device. Supplemental information, such as from additional sensors or other suitable sources may be used as desired. In one aspect, this disclosure may employ signal analysis or machine learning techniques to make one or more of these determinations. Signal analysis techniques include many approaches such as statistical, time domain, and/or frequency domain analysis and the machine learning techniques may involve extracting features from the sensor data and inputting the extracted features into a classification model generated offline during a training phase. Any combination of machine learning and signal analysis techniques, or both, may be employed. Examples of these techniques are described in the following materials, but any suitable means may be employed.

With reference to 102 of FIG. 1, the determination of whether the portable device is in a moving vehicle may be based on motion sensor data, such as information from inertial sensor 212, external sensor 214 and/or auxiliary sensor 216. Detector 220 may be configured to use the motion sensor data to determine whether portable device 200 is within a moving vehicle.

In one embodiment, a machine learning approach may be employed in which a classification model is built using different types of statistical, time-domain, and frequency-domain features extracted from a large set of training trajectories of both vehicle motion modes, such as experienced in an automobile, another wheeled vehicle (e.g., car, truck, bus, motorcoach, or the like), boat, heavy equipment, or other motorized vessels, and non-vehicle motion modes, such as for example walking, running or cycling among others. For example, three-axis accelerometer and three-axis gyroscope data may be used. Optionally, additional information, such as from a magnetometer (e.g., a three-axis magnetometer), a barometer, location module 224 (e.g., GNSS information) and/or from other suitable sources.

Figure 3:
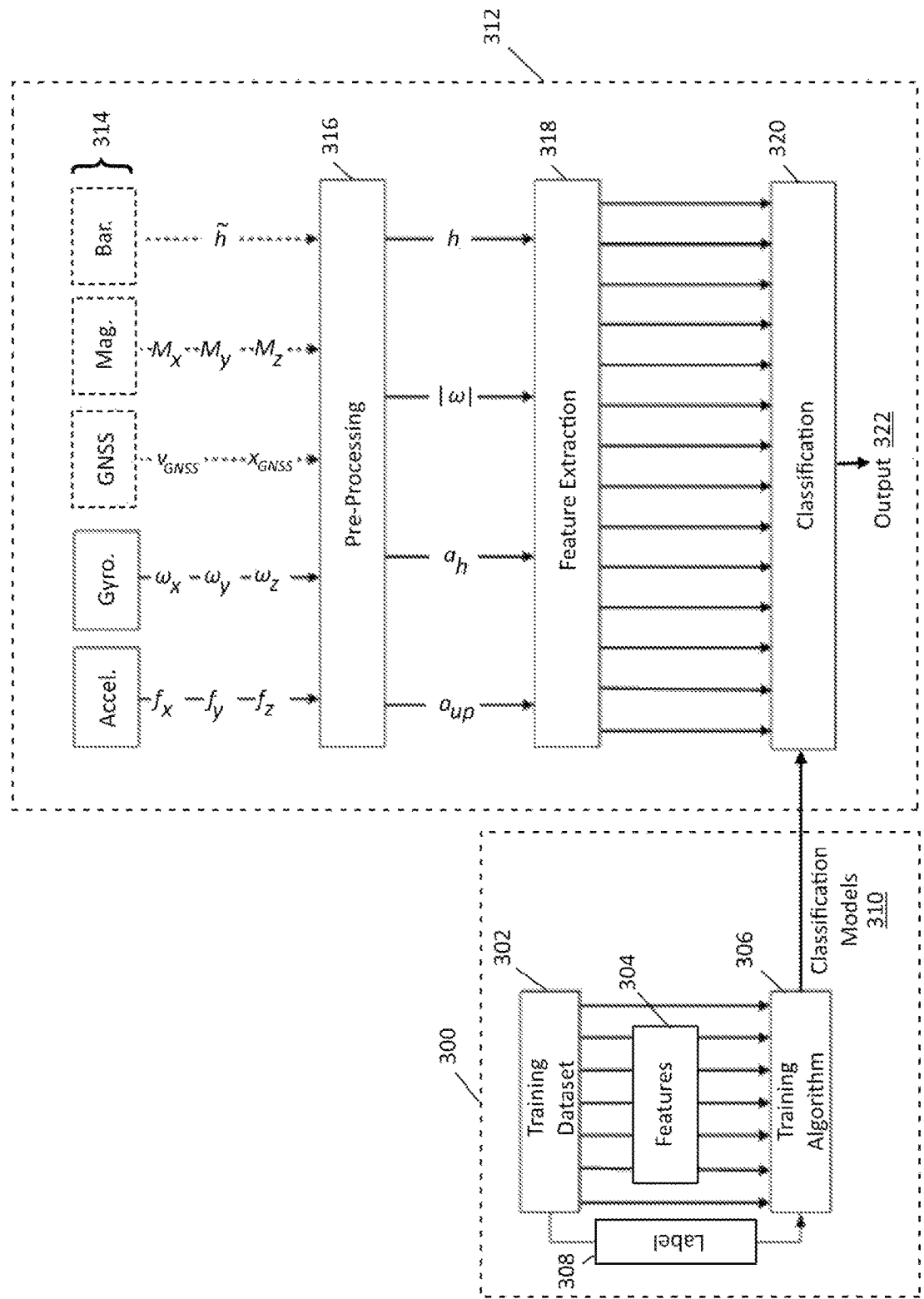
FIG. 3 is a schematic representation of training and identification phases to be used for user and moving vehicle detection according to an embodiment.

An exemplary configuration is schematically depicted in FIG. 3. During an offline training phase 300, data sets of representative trajectories for desired vehicle motion modes may be supplied in 302, from which statistical, time-domain, and/or frequency-domain features may be extracted in 304 and supplied to a suitable training algorithm in 306. A label 308 representing whether the motion mode of each data set corresponds to a moving vehicle may be associated with the extracted features by the algorithm to generate classification models 310.

One or more classification models may then be supplied to the portable device, such as to detector 220 of portable device 200 for use in an identification phase 312 during which it may be determined whether portable device 200 is in a moving vehicle. In 314 accelerometer and gyroscope motion sensor data, and optionally, GNSS, magnetometer and/or barometer data, may be obtained for portable device 200. As indicated; this may include measurements of specific forces and angular rates, velocity, position, and/or altitude. In 316, any suitable combination of this data may be preprocessed, such as in a sensor fusion operation to estimate certain variables. Preprocessing may also include performing filtering operations, such as with a low pass filter to reduce noise. Preprocessing may also include leveling one or more sensor measurements to account for an orientation of portable device 200, such as in the form of determined roll or pitch angles indicating a relationship to a suitable external frame of reference. These variable may include any of: $a_{up}$, representing a net acceleration component of portable device 200 along the axis normal to the surface of the Earth; $a_h$, representing magnitude of the acceleration component along the plane parallel to the surface of the Earth; $|\omega|$, representing the norm of compensated angular rotation components; h, representing smoothed altitude, which may include barometric altitude if available, fused with smoothed levelled vertical acceleration; and/or $v_{up}$, representing differentiation of smoothed height with respect to time.

In 318, features may be extracted from the variables output by 316, suitable features include statistical features, representing either the central or typical value, or a measure of the spread of data, across a window; energy, power, and magnitude features, representing the overall intensity of the data values across a window; time-domain features, representing how a signal or variable varies with time; frequency-domain features, representing a variable or signal in the frequency domain; or any other features, such as cross-correlation between the acceleration components. The extracted features may then be fed to 320 for classification by evaluation of the features extracted in 318 into the models 310 derived during training phase 300. Classification as represented by 320 may be a decision tree, support vector machine, artificial neural network, Bayesian network, or any other machine learning Of pattern recognition model, or combination thereof. Based on the output, detector 220 may determine whether portable device 200 is in a moving vehicle.

In one embodiment, a signal analysis approach may be employed in which a statistical (e.g., mean or variance), time-domain (e.g., peak detection), or frequency-domain (e.g., Fast Fourier Transform or wavelet or wavelet transform) analysis may be performed, or a combination of these techniques may be employed. As in the machine learning approach, three-axis accelerometer and three-axis gyroscope data may be used. For example, the analysis may include at least one of an angular rotation signal, a signal derived from the angular rotation signal, an acceleration signal, and a signal derived the acceleration signal. Also similarly, additional information, such as from a magnetometer (e.g., a three-axis magnetometer), a barometer, location module 224 providing a source of absolute navigational information (e.g., GNSS information) and/or from other suitable sources is optional and may be employed as desired.

Figure 4:
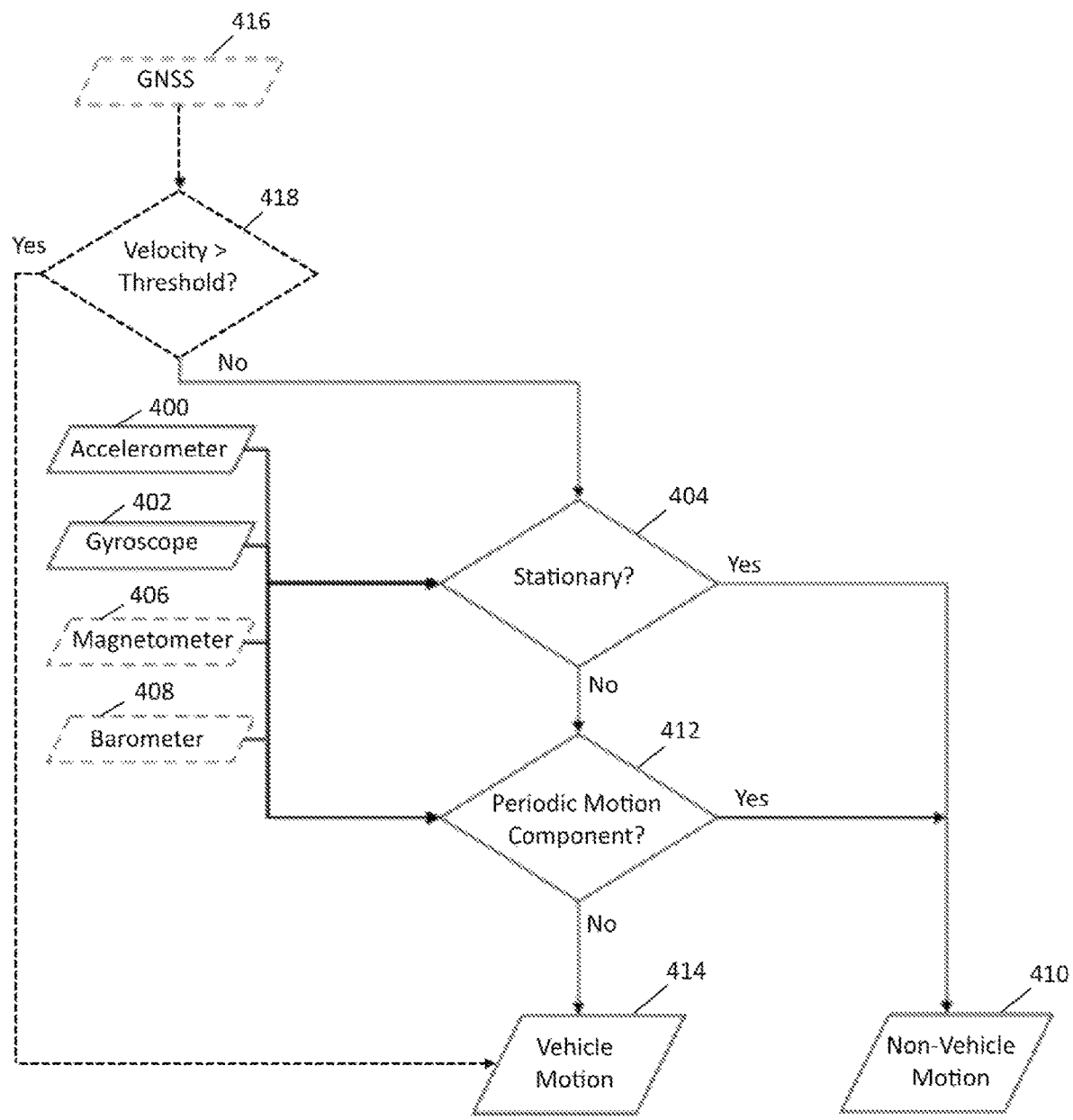
FIG. 4 is a flowchart showing a routine for determining whether a portable device is in a moving vehicle according to an embodiment.

An exemplary routine is schematically depicted in the flowchart of FIG. 4. Inputs, including accelerometer data 400 and gyroscope data 402, such as from inertial sensor 212, external sensor 214 and/or auxiliary sensor 216, may be fed to 404 and used by detector 220 to determine whether portable device 200 is stationary. As indicated, additional information, depicted as magnetometer data 406 and barometer data 408 optionally may be used if desired and available. Depending on the implementation, barometer and/or magnetometer data may be obtained from external sensor 214 and/or auxiliary sensor 216. Information from other suitable sources may also be employed. For example, determination of whether portable device 200 is stationary may include deriving the variance, mean, and magnitude of certain frequency bins, of the specific force measurements from the accelerometer and the rotation measurements from the gyroscope over pre-defined length windows and comparing the values against suitable thresholds to identify whether the platform conveying portable device 200 is stationary or not. As indicated by 404, if such vales are less than corresponding thresholds, the platform may be assumed to be stationary and the routine may branch to 410 resulting in a determination portable device 200 is not in a moving vehicle.

Otherwise, if the determination in 404 is that the platform is not stationary, the motion sensor data, including accelerometer data 400 and gyroscope data 402, may be fed to 412 for determination of whether a periodic motion component is present. Again, use of magnetometer data 406, barometer data 408 and/or other suitable sources of information is optional and may be used if desired and available. When a periodic motion component is present, it may indicate the user is undergoing a regular, repeating motion. Since a periodic motion component is characteristic of human-powered motion, such as walking, running, cycling and the like, a positive determination in 412 may cause the routine to branch to 410 resulting in a determination portable device 200 is not in a moving vehicle. For example, the specific force measurements may be transformed to obtain the levelled vertical acceleration (i.e., acceleration along the axis perpendicular to the Earth's surface). Correspondingly, if regular maxima peaks Occur with amplitudes exceeding an appropriate threshold and if peak-to-peak time periods exceeding an appropriate threshold are detected, then footsteps or cycle pedals may be assumed. However, if no or an insufficient periodic motion component is detected, the routine may continue to 414, resulting in a determination portable device 200 is in a moving vehicle. Otherwise, it is identified that the phone is not in a moving vehicle, i.e., assumed that the user carrying the phone may be walking, running, or cycling for example or other non-vehicular motion.

As an optional adjunct, if GNSS data 416 is available, such as obtained from location module 224, detector 220 may determine in 418 whether portable device 200 is experiencing a velocity greater than an appropriate threshold. Other sources of absolute navigational information may also be used to derive velocity for portable device 200. If the velocity exceeds the threshold for a sufficient period of time, such as several seconds, it may be assumed that portable device 200 is in a moving vehicle and the routine may jump to 414. Otherwise, the routine may continue to 404 to perform the operations described above, since velocity below the threshold may indicate portable device 200 is stationary Of the platform is the user cycling, running or walking. Further, the velocity information determined from GNSS data 416 may be used to supplement or facilitate the determinations made in 404 and 412.

Turning now to 104 of FIG. 1, the determination of whether the portable device is connected to the user may be based on motion sensor data, such as information from inertial sensor 212, external sensor 214 and/or auxiliary sensor 216, for example by detector 220. In progressing to this stage, it has already been determined that portable device 200 is in a moving vehicle. Correspondingly, a characterization of the user's association with the portable device may be made. For example, it may be distinguished whether portable device 200 is connected to the vehicle or to the user. As noted above, portable device 200 may be secured in a cradle or holder or otherwise mounted to the vehicle. For the purposes of this disclosure, being connected to the vehicle may also include resting on a seat, dashboard, or other surface of the vehicle. Alternatively, portable device 200 may be connected to the user by being in hand, in a pocket in a belt holder or the equivalent.

Figure 5:
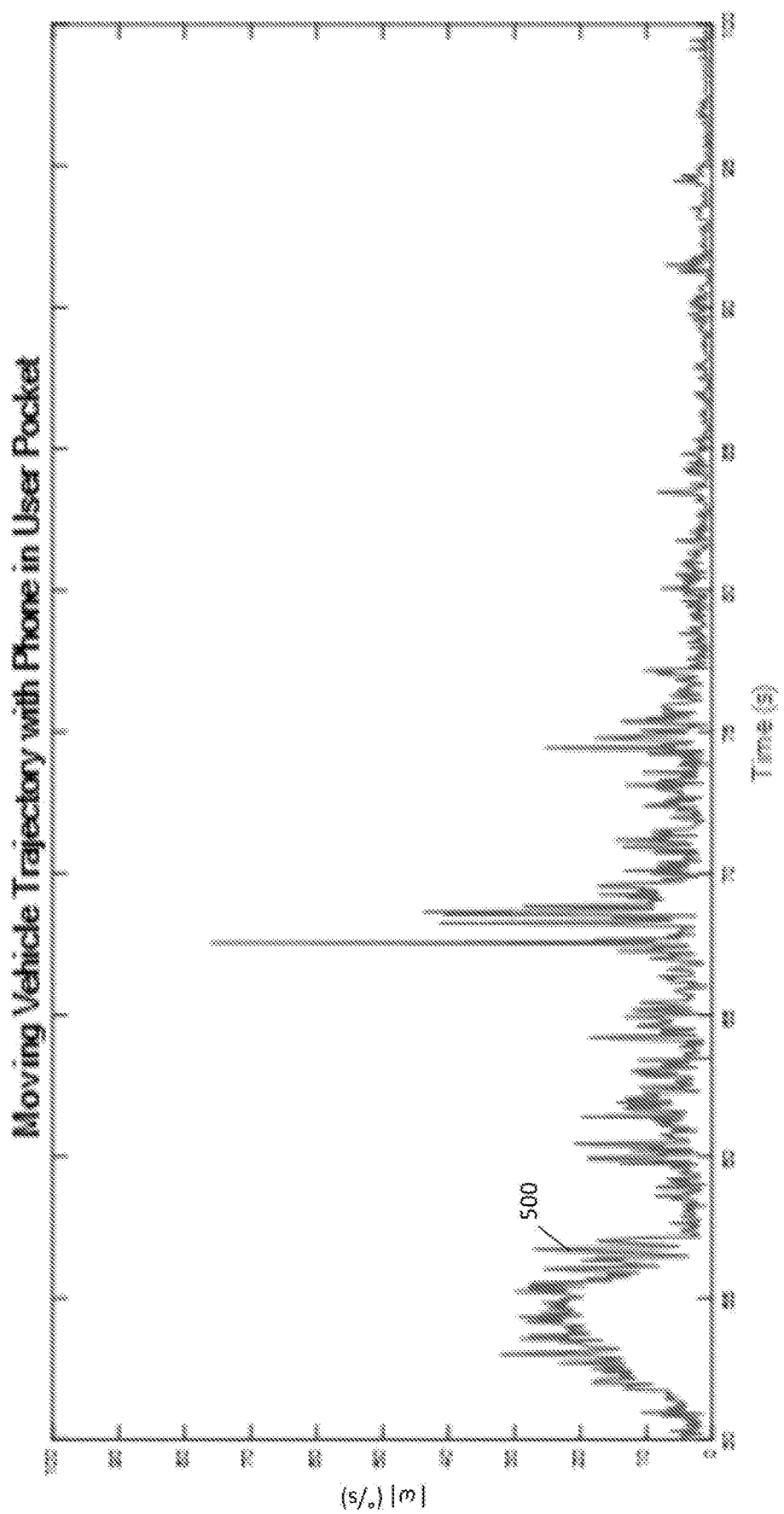
FIG. 5 is a graphical representation of sensor data characteristic of a portable device in a moving vehicle that is connected to the user according to an embodiment.
Figure 6:
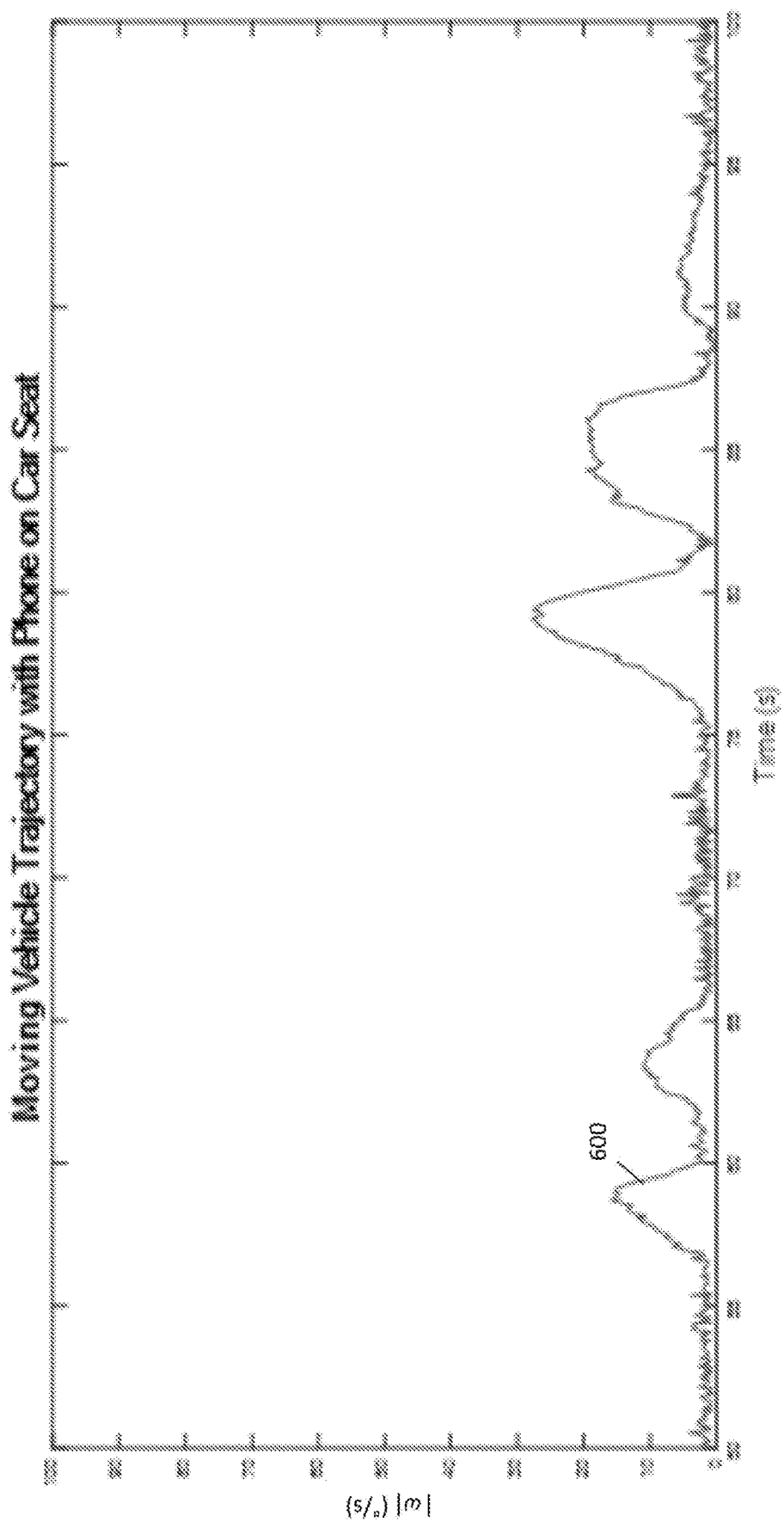
FIG. 6 is a graphical representation of sensor data characteristic of a portable device in a moving vehicle that is not connected to the user according to an embodiment.

In one embodiment, a machine learning approach using similar techniques to those described above with regard to FIG. 3 may be employed. In this context, the data sets used in training phase 300 to generate the classification models 310 may include trajectories obtained in a moving vehicle, at varying speeds, with the portable device being connected to either the user or the vehicle in a variety of manners. Identification phase 312 may also be employed using the information obtained in 314, followed by preprocessing in 316, feature extraction in 318 and classification in 320 as described above. Based on the output, detector 220 may determine whether portable device 200 is connected to the user or to the vehicle. In one embodiment, a signal analysis approach may be applied to the sensor data and/or other information, using any suitable technique, such as those described above and including, without limitation, a statistical analysis, a frequency-domain analysis and/or a time-domain analysis. For example, determination of whether portable device 200 is connected to the user may include analyzing one or more of angular rotation signals, or a signal deduced from them (e.g., levelled vertical angular rotation or a compensated norm of angular rotations), and acceleration measurements, or a signal deduced from them (e.g., levelled vertical acceleration). To help illustrate one aspect, the norm of compensated angular rotation components $|\omega|$ for portable device 200 in a moving vehicle and connected to the user by being carried in a pocket is shown in FIG. 5 as trace 500, while FIG. 6 shows as trace 600 for portable device 200 in a moving vehicle and connected to the vehicle by resting on a seat. As can be seen, the envelope amplitude has a higher value when portable device 200 is connected to the user. Further, the amplitude of the higher frequency components are greater.

As another example, determination of whether portable device 200 is connected to the user may include a frequency-domain analysis. At specific frequency bins, the amplitude of acceleration or angular rotation may fall in different value ranges depending on whether portable device 200 is connected to the user or to the vehicle.

Alternatively or in addition, the occurrence of an interruption event may indicate likelihood that the user is or will be holding portable device 200 in hand. Interruption events may include receiving a call, message, email, or any other application notification that suggests the user may intend to use the phone. Correspondingly, in some embodiments the occurrence of an interruption may be used to proceed to 106 to determine if portable device 200 is hand held.

In reference now to 106 of FIG. 1, the determination of whether the portable device is hand held may be based on motion sensor data, on additional sensor data, on other information obtained from portable device 200, or any combination of these factors. When such a determination involves additional sensor data or other information, it is notable that these inputs are required only when earlier positive determinations have been made, conserving the power and processing resources. Given that it has been determined in 104 that portable device 200 is connected to the user, characterizing how the user is carrying, holding, or using the device may include determining a device use case. As used herein, "device use case" refers to the type of interaction between a portable device and the user, and may include hand held use cases, including when the user is holding the device, positioning it "on ear" when talking; inputting data or viewing in a navigation or texting operation, or the like as opposed to other use cases in which portable device 200 is connected to the user, but not hand held, such as being carried in a pocket or other container or holder that is attached to the user.

Figure 7:
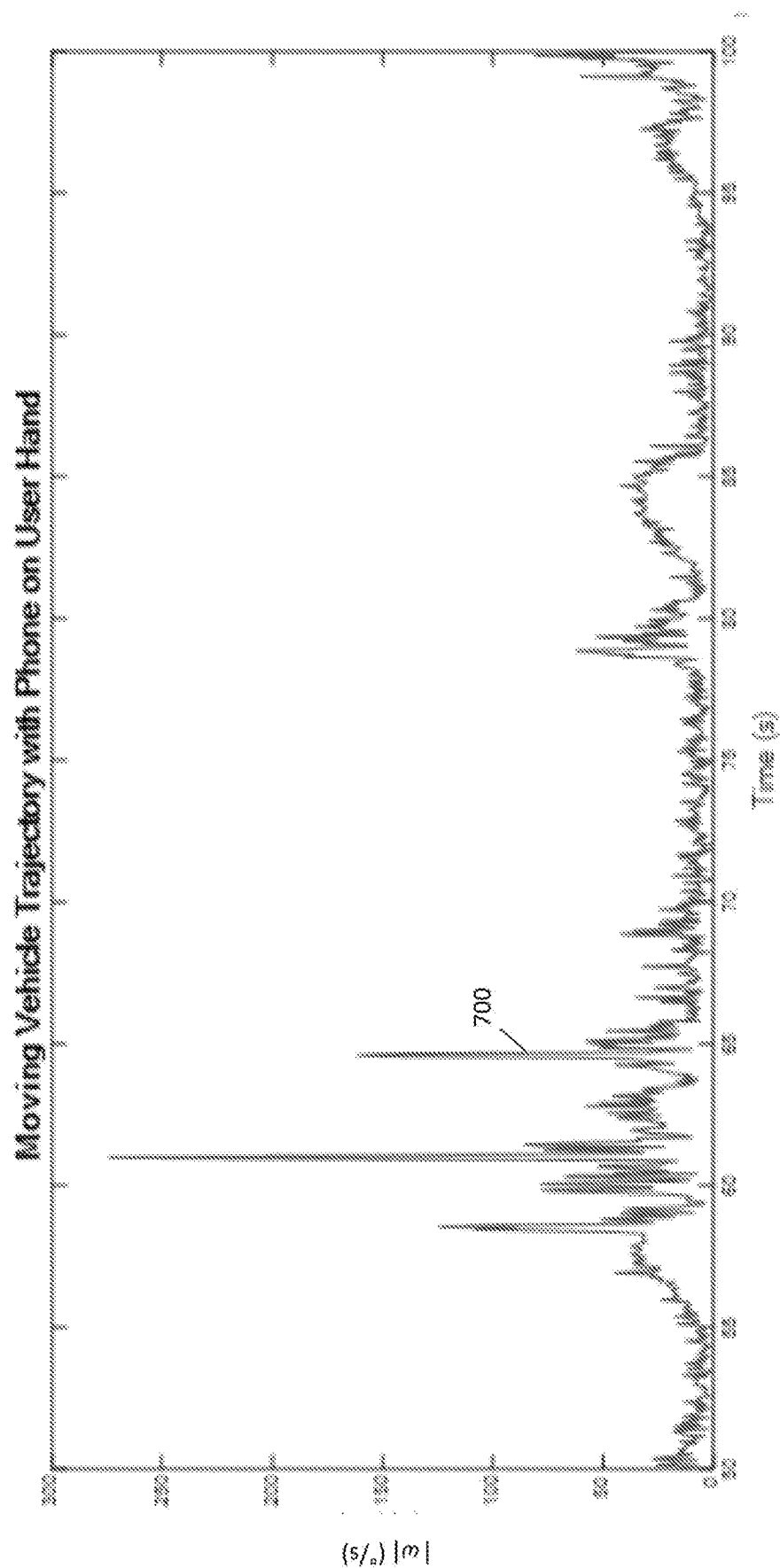
FIG. 7 is a graphical representation of one example of sensor data characteristic of a portable device held in hand according to an embodiment.
Figure 8:
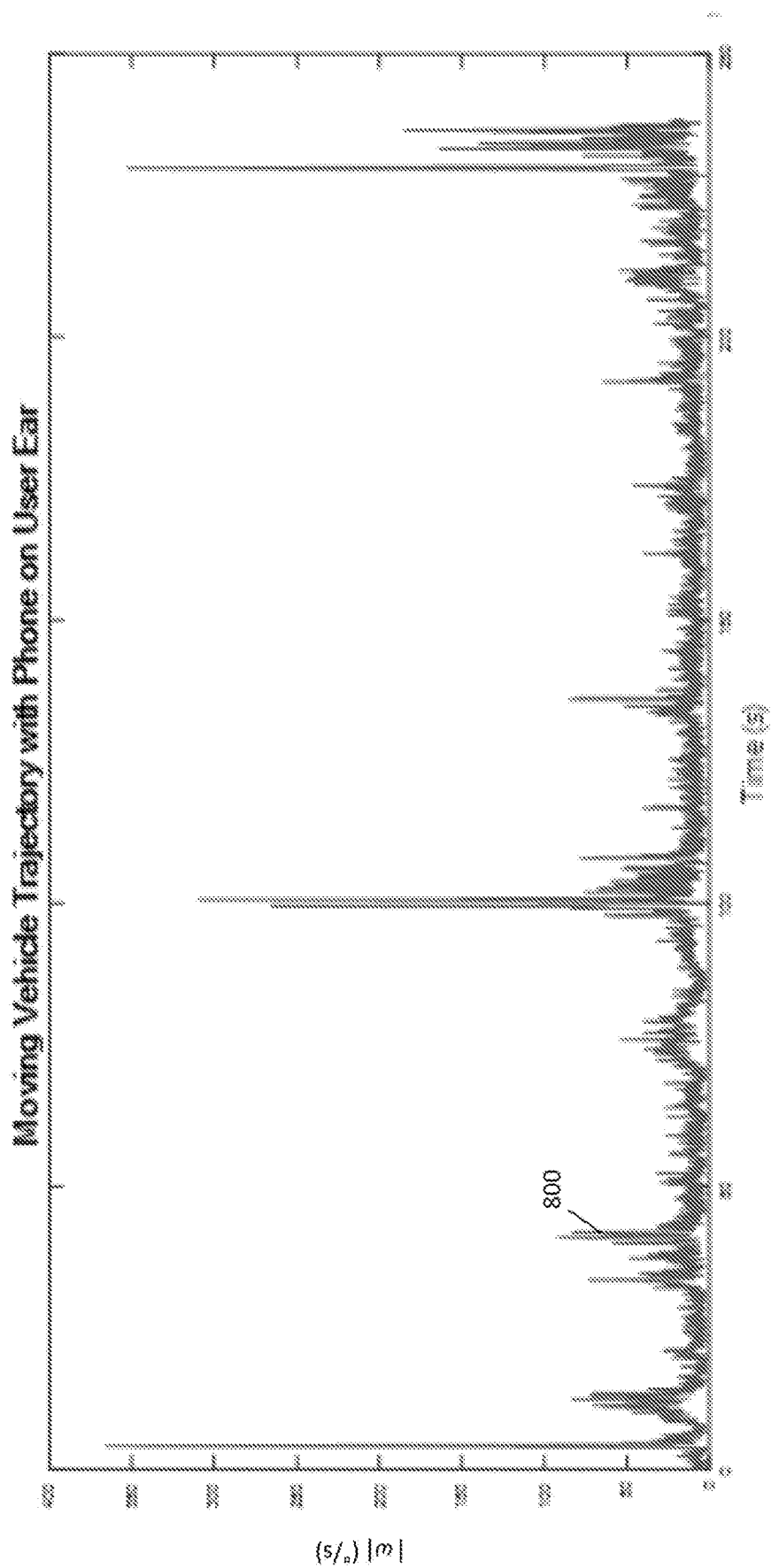
FIG. 8 is a graphical representation of another example of sensor data characteristic of a portable device held in hand according to an embodiment.
Figure 9:
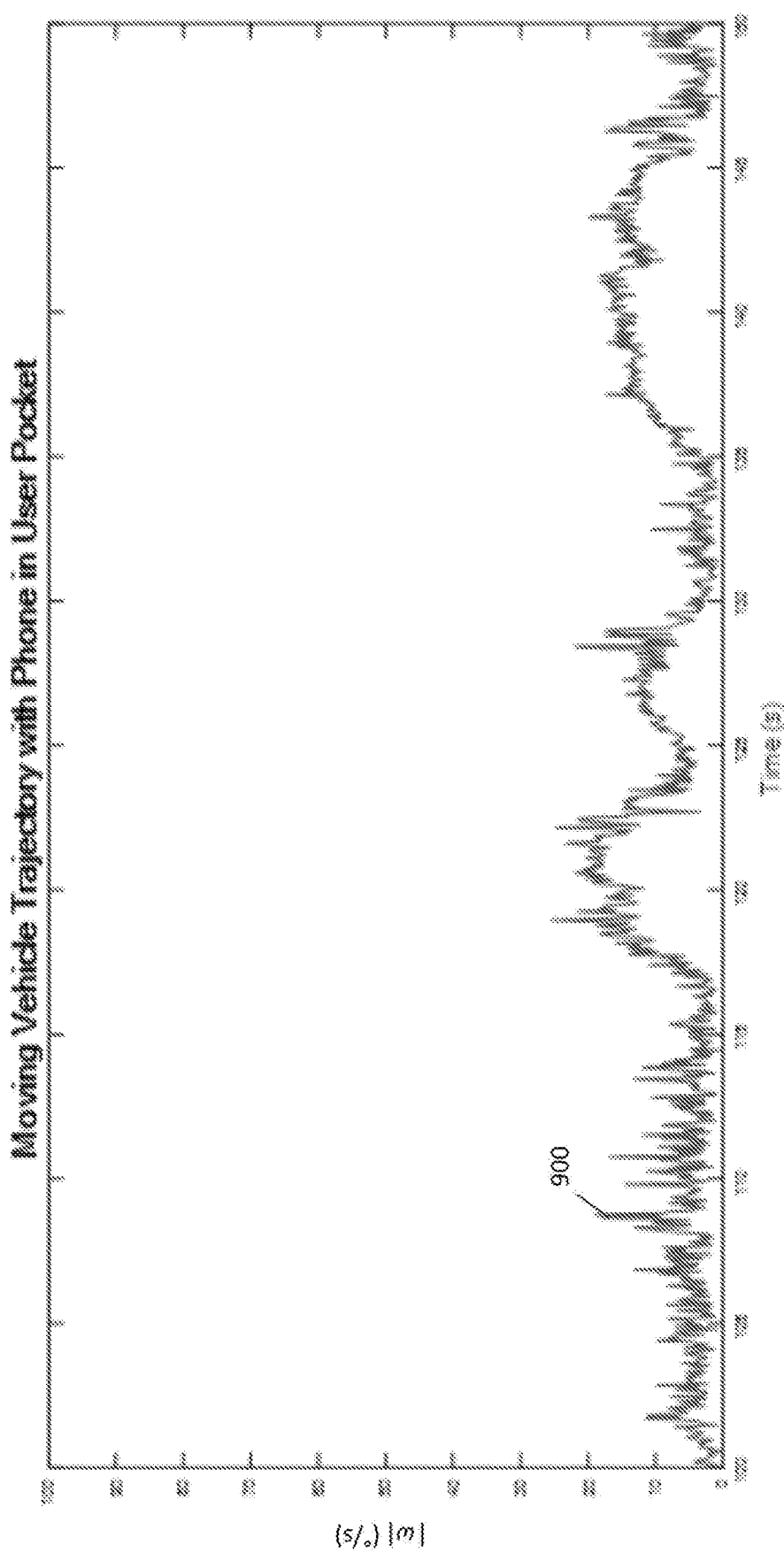
FIG. 9 is a graphical representation of one example of sensor data characteristic of a portable device not held in hand according to an embodiment.
Figure 10:
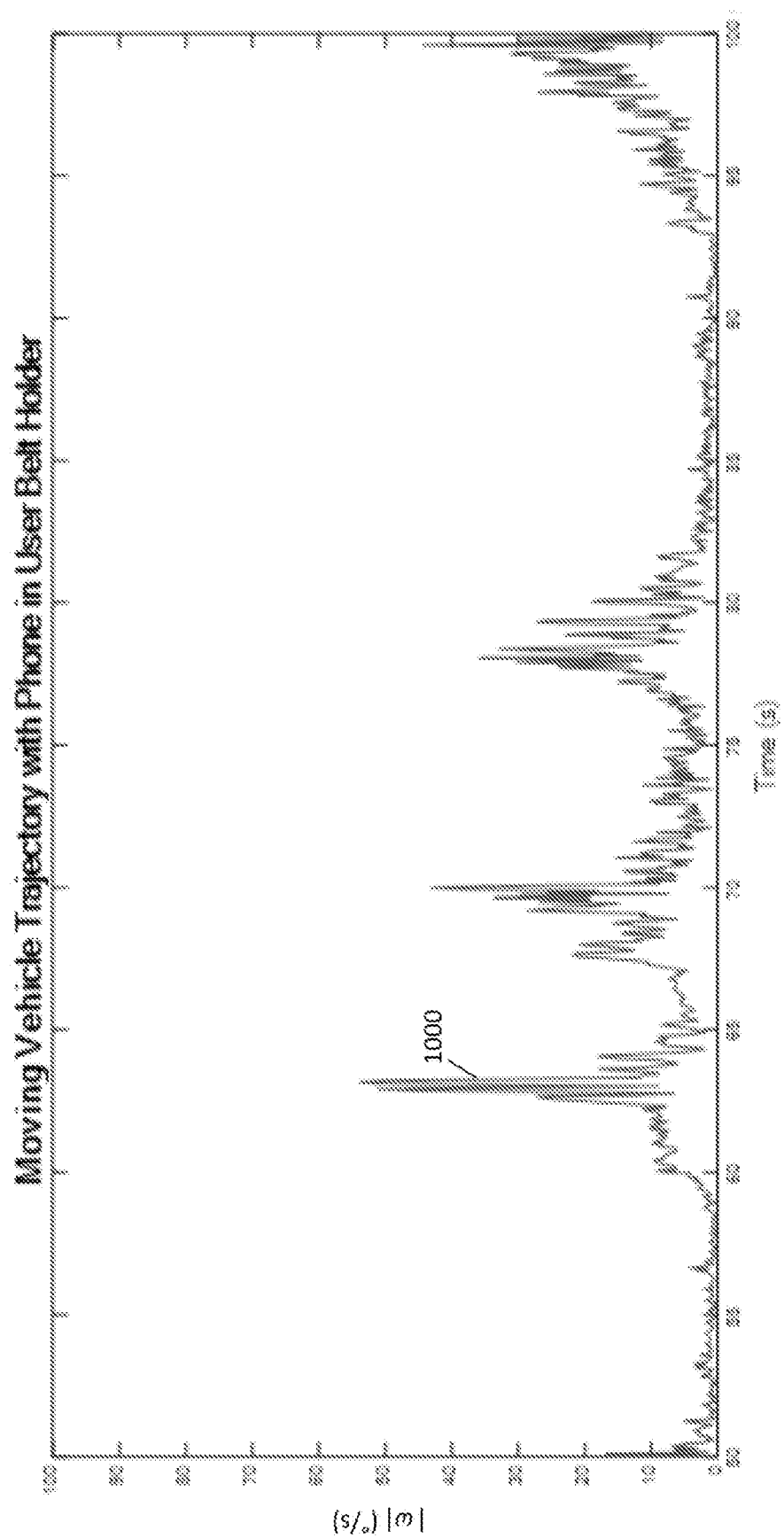
FIG. 10 is a graphical representation of another example of sensor data characteristic of a portable device not held in hand according to an embodiment.

In one aspect, motion sensor data may be used in machine learning and/or signal analysis approaches similar to those described above to identify hand held device use cases. When employing a machine learning approach, the data sets in training phase 300 may represent the varying possible device use cases, obtained while a portable device is in a moving vehicle. Correspondingly, the generated classification models 310 may be used by detector 220 in the identification phase 312 to detect whether portable device 200 is being held in the user's hand. Alternatively or in addition, a signal analysis approach as described above may be used, such as a statistical analysis, a frequency-domain analysis and/or a time-domain analysis. For example, determination of whether portable device 200 is hand held may include analyzing one or more of analyzing one or more of angular rotation signals, or a signal deduced from them (e.g., levelled vertical angular rotation or a compensated norm of angular rotations), and acceleration measurements, or a signal deduced from them (e.g., levelled vertical acceleration). To help illustrate, FIGS. 7 and 8 show a suitable signal analysis for a hand held portable device and FIGS. 9 and 10 show a suitable signal analysis for a device connected to the user, but not hand held. Notably, the norm of compensated angular rotation components $|\omega|$ for portable device 200 in a moving vehicle and held in hand is shown in FIG. 7 as trace 700, while FIG. 8 shows $|\omega|$ as trace 800 for portable device 200 in a moving vehicle and positioned on ear. In contrast, $|\omega|$ for portable device 200 in a moving vehicle and being carried in a pocket is shown in FIG. 9 as trace 900, while FIG. 10 shows $|\omega|$ as trace 1000 for portable device 200 in a moving vehicle and being attached to a belt clip. As can be seen by comparing these figures, the angular rotations have greater amplitudes for higher frequency dynamics when portable device 200 is hand held than when otherwise connected to the user. Such differences may be obtained using wavelet transforms or frequency analysis.

In one aspect, data from other types of sensors may also be used when determining whether portable device 200 is hand held. As will be appreciated, these techniques may be used alternatively or in addition to techniques employing motion sensor data. For example, a proximity or infrared sensor, such as external sensor 214 and/or auxiliary sensor 216, may be provided to turn off the screen when portable device 200 is held close to the ear, such as during a phone call. Thus, proximity sensor data may represent the presence of objects at a close distance. Similarly, an ambient light sensor, such as external sensor 214 and/or auxiliary sensor 216, may be used to sample ambient lighting conditions around portable device 200 and automatically adjust screen brightness of the phone screen. Either or both types of sensors may be used by detector 220 to determine whether portable device 200 is inside a pocket, a holster or is otherwise enclosed. Under these circumstances, it may be assumed portable device 200 is not hand held.

In one aspect, other sources of information from portable device 200 may be used to determine or help determine whether it is hand held. For example, the status of one or more applications running on portable device 200 frilly provide an indication of whether the user is actively operating the portable device and therefore may be holding the device in hand. Notably, when the user is exploring a website on the Internet, using any of the social networking applications such as Facebook or Twitter, texting or talking using a microphone of the portable device, browsing directories or files, or the like, it may be assumed that portable device 200 is hand held.

Following positive determinations that portable device 200 is in a moving vehicle, is connected to the user and/or is hand held, detector 220 may then determine whether the user is operating the vehicle as indicated by 108 of FIG. 1. As will be described below, one suitable technique for distinguishing the operator of a moving vehicle from a passenger may involve the use of information from image sensor 277.

Image processing has recently undergone great advancement in utilizing artificial intelligence methods and techniques to identify and/or extract features or objects in images. As such, computer vision techniques may be used in aspects of this disclosure to facilitate user and moving vehicle detection. As noted above, portable devices such as portable device 200 are commonly equipped with one or more image sensors 222. For example, typical smart phones May have both front- and rear-facing cameras, either or both of which may be used in embodiments of this disclosure. When multiple image sensors 222 are available, the source of a given image may provide useful information. For example, if an object such as a steering wheel is detected by a rear-facing camera, it may be expected that features associated with the user may be detected by the front-facing camera. Conversely, if the steering wheel is detected by the front-facing camera, it may be less likely that the user is interacting with the portable device, and therefore may not be holding it in hand.

In one aspect, determinations involving image sensors, such as determination of whether the user is operating the moving vehicle in 108 may occur only when earlier positive determinations have been made, conserving the power and processing resources associated with activating and using the image sensor(s). Correspondingly, after it has been determined portable device 200 is in a moving vehicle in 102, that portable device is connected to the user in 104 and that portable device is held in hand in 106, data from image sensor 222 may be processed to provide information about the user of the portable device. Features and objects that may be identified in an image and/or sequence of images captured from image sensor 22 may include the user face, the steering wheel of other controls of the moving vehicle, windows, mirrors and the like. By analyzing the orientation of one or more of these features and objects, detector 220 may determine whether the user is operating the vehicle be employing any suitable technique, such as those described in the following material.

Figure 11:
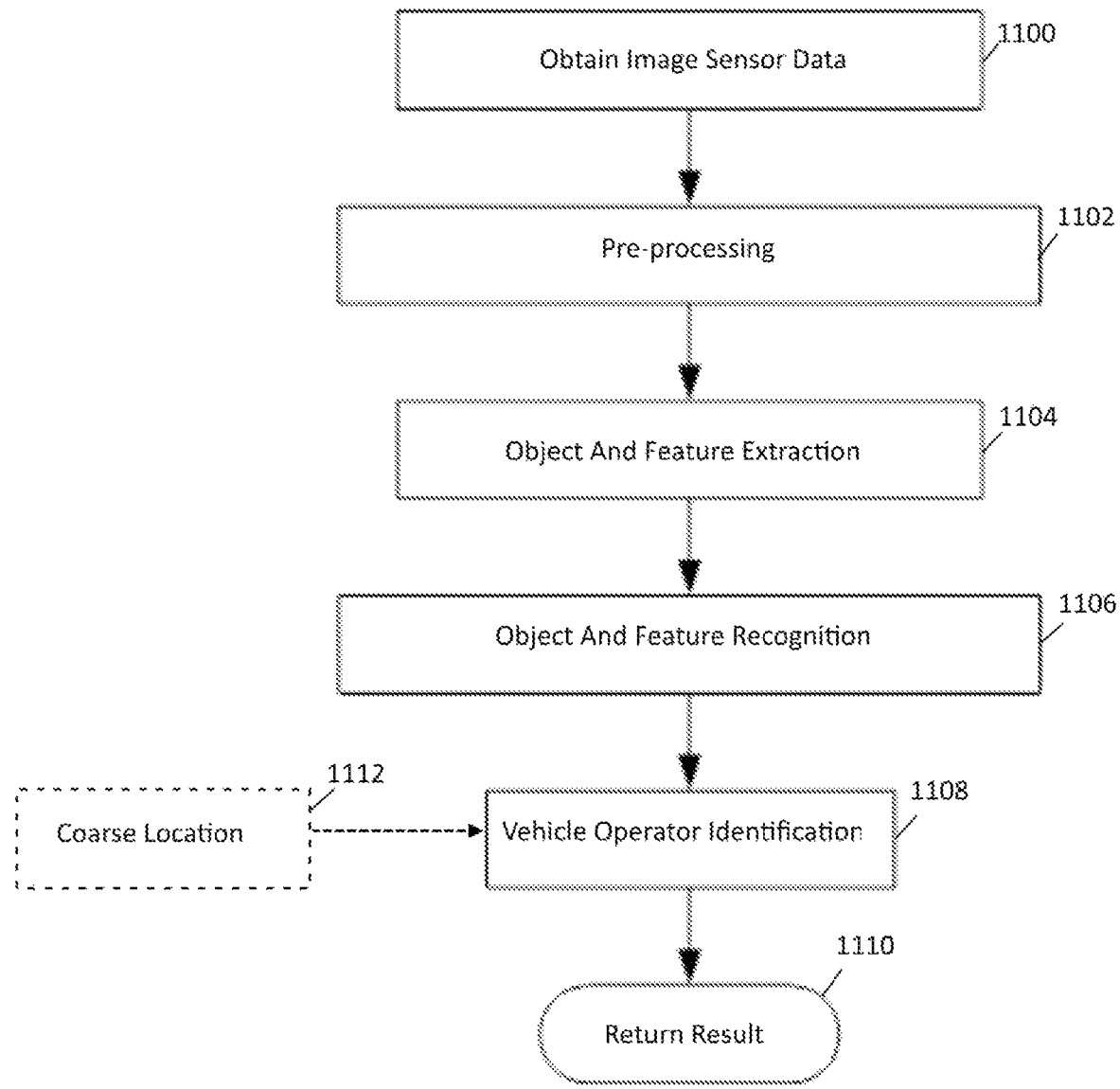
FIG. 11 is a flowchart showing a routine for determining whether the user is operating the moving vehicle according to an embodiment.

As a representative example, FIG. 11 depicts a flowchart that schematically represents an overview of a suitable routine for determining whether the user is operating the moving vehicle. Beginning with 1100, image sensor data may be obtained, such as from image sensor 222. The captured image(s) may then be pre-processed in 1102 to facilitate a feature extraction process. Objects and features may then be extracted in 1104 using suitable techniques. The extracted objects and features may be recognized in 1106 and used to identify whether the user is operating the moving vehicle, outputting the determination in 1110. For example, the output of 1110 may include a positive identification that the user is operating the moving vehicle, a positive identification that the user is a not operating the moving, vehicle (e.g., a passenger), or that insufficient confidence exists to make a positive identification of either. Each of these results may be acted upon as desired.

Further, as an optional input, a coarse location for portable device 200 may be determined in 1112 and used for vehicle operator identification in 1108. The coarse location may be used to determine the expected configuration of the interior of the vehicle as the vehicle's design may vary at different locations around the world. For example, in automobiles, the steering wheel and operator seat is typically located on the left side in the majority of the countries, yet in countries such as England, they are typically located on the right side. Similarly, the expected orientation of the shoulder portion of a seat belt worn by the operator of the vehicle will also vary depending on location. The coarse location information may be provided by location module 224 and as noted, may be based on GNSS information, wireless communication signal trilateration or others. Alternatively or in addition, the coarse location may be obtained from a source such as an Internet provider when portable device is connected to a network. In some embodiments, it may be anticipated that portable device 200 will be used only within a limited geographic area. Accordingly, detector 220 may be preprogrammed with the expected positioning of the operator of a moving vehicle.

Figure 12:
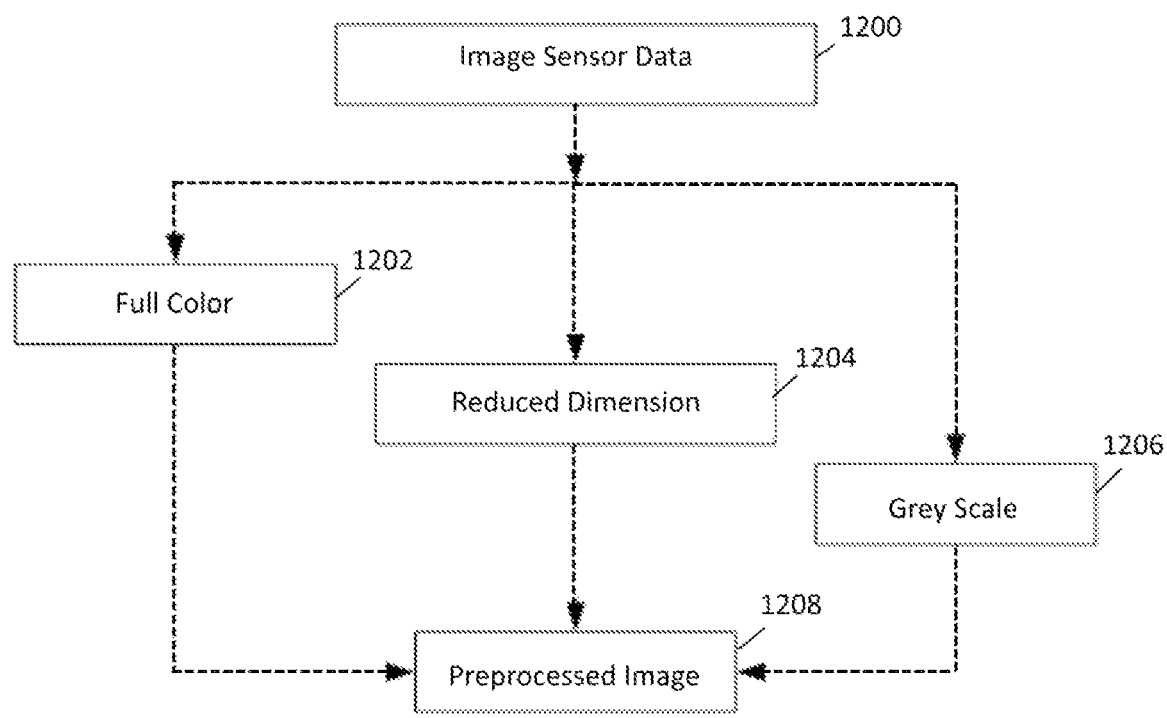
FIG. 12 is a flowchart showing a routine for preprocessing image sensor data in determining whether the user is operating the moving vehicle according to an embodiment.

In one aspect, the image pie-processing techniques applied in 1102 may be configured to enhance the readability of the captured images by the later stages of the routine. Image pre-processing may be done prior to the Object and feature extraction process, and in some embodiments may be omitted or applied to varying degrees, depending on the characteristics of the captured images. Examples of suitable techniques that may be applied in 1102 include image normalization, de-noising, and filtering. Other pre-processing techniques such as color schemes conversion and dimension reduction may also be applied. One suitable routine is represented by the flowchart of FIG. 12. The raw image sensor data may be obtained in 1200. Next, as indicated by the dashed lines, any one or combination of parallel operations may be performed on the image sensor data.

In 1202, a full color version of the raw image sensor data is employed. Some objects in the captured image/sequence of images can be detected/extracted based on color features.

For example, color feature can help to facilitate the process of the face detection technique. The face detection color based technique can be used to tell if the captured image(s) contains face or not. Also, it may be used to provide the location of the face with respect to the image frame. Another example where color feature may be used is to identify the seat belt, this may be used to aid the line feature extraction.

In 1204, a reduced dimension version of the raw image sensor data may be generated to decrease the amount of information being processed. Dimensionality reduction is an effective approach to downsizing data and may result in a more compact representation of the original data. Dimensionality reduction techniques using linear transformations have been used in determining the intrinsic dimensionality of the manifold as well as extracting its principal directions. Any of the many possible dimensionality reduction methods known in the art may be employed. In one embodiment, a Principal Component Analysis (PCA) may be used which defines mutually-orthogonal linear combinations of the original attributes. PCA represents a linear transformation of the data into a new coordinate system, such that the greatest variance by any projection of the data comes to lie on the first coordinate. In another embodiment, an Independent Component Analysis (ICA) may be used for dimensionality reduction, by finding a linear representation of non-Gaussian data so that the components are statistically independent, or as independent as possible. Still further, a Discrete Wavelet Transform (DWT) operation may be performed. DWT is a low dimension multi resolution analysis technique that represents important features of mages and may alleviate heavy computational load, reduce noise, and produce a representation in low frequency domain that makes the features less sensitive to variation, as well as other benefits.

In 1206, a grey scale version of the raw image sensor data may be generated. Many digital images may be comprised of three separate color channels, a red channel, a green channel and a blue channel, such that layering these channels on top of each other creates a full-color image. A gray scale image is a white and black image contains intensity values ranging from black to white with a range of shades of gray without apparent color. As such, using a grayscale color scheme may generate images that are less complex and more suitable for object and feature extraction and recognition. For example, in some circumstances use of a full color information does not result in better extraction or recognition and therefore represents an unnecessary expenditure of resources. Further, a grayscale images may facilitate techniques such as edge detection, described below.

Any one or combination of 1202, 1204 and 1206 may be performed to generate the preprocessed image(s) output in 1208. Other suitable preprocessing techniques may also be performed, as supplements or alternatives. For example, an image resizing operation may be performed to generate different sizes that may help in the feature and object extraction. In one aspect, the raw image sensor data may be resized using nearest neighbor interpolation method with a specified output size for the resulting image. Other suitable techniques may also be performed. As another example, an image normalization operation may be performed. The raw image sensor data may have unprocessed or uncontrolled lighting conditions, resulting in a captured image with non-uniform contrast, such as by having suboptimal distribution of intensity or gray levels. Different techniques, including a histogram equalization technique, may be used to provide more uniform levels. As yet another example, a de-noising operation may be performed. The raw image sensor data may exhibit Gaussian noise due to illumination variations and the noise may be reduced using pixel based filtering techniques, such as by employing a Low Pass Filter (LPF) to eliminate or reduce high frequency information and preferentially retain low frequency information.

Turning now to object and feature extraction in 1104 and recognition in 1106 as indicated by FIG. 11, a given feature may be defined as a function of one or more measurements, each of which specifies some quantifiable property of an object, and is computed such that it quantifies some significant characteristics of the object. Features may be classified into general features and domain-specific features. General features include application independent features such as color, texture, and shape, while domain-specific features include application dependent features, such as human faces, fingerprints, and conceptual features. A feature may also be a mixture of low-level features for a specific domain. Features may also be considered low-level features, such as may be detected directly from a captured image, and high-level features, which may be detected based at least in part on detected low-level features.

As will be appreciated, color, texture, and shape represent common features of interest for image analysis. A color feature is a commonly used visual feature in image extraction. For example, a color histogram may be used to describe the distribution of colors within an image and is invariant to rotation, translation and scaling of an object. In addition to such red, green and blue (RGB) color models, there are several other alternative models can be used such as a HIS (Hue, Saturation, Intensity) color representation that may be useful for extracting certain features such as lips, eyes, and eyebrows. Further, texture is another important property of images that represents a powerful regional descriptor for use in the object and feature extraction. Texture may be used to classify textured images from non-textured ones and then combined with other visual attributes, such as color. Texture may be extracted using different methods known in the art, including statistical methods, such as Fourier power spectra, Markov random field, fractal model, and multi-resolution filtering techniques such as Gabor and wavelet transform.

Different techniques may also be used for object and feature extraction as desired, including signal processing and analysis based techniques, machine learning based techniques, and others. One example of a suitable global processing method is the Hough transform, which may be used to isolate features of a particular shape within an image. The classical Hough transform requires the desired feature to be specified in some parametric form, and is therefore most commonly used to detect regular curves, such as lines, circles and ellipses.

As another example, detection of straight edges and/or lines may provide useful information in the recognition process. In a grayscale image, an edge generally represents the border between two blocks of different intensity and a line may be defined as a number of pixels of a different intensity on an otherwise unchanged background, analogous to one edge at each side of the line. Thus, an edge in a capture image may be considered an abrupt change in the intensity of the image pixels or a discontinuity in image brightness or contrast. Correspondingly, edge detection may include identifying and locating boundaries of image regions based on properties such as intensity and texture to be used in image analysis and provides useful information for recognition. As will be appreciated, the shape of the edges may depend on many parameters such as geometrical and optical properties of an image, illumination condition, noise level in the image and others. Any of a number of suitable methods may be employed to perform edge detection. For example, many edge detection methods are based on the analysis of the image derivatives. As differential operators are sensitive to noise, preprocessing in 1102 may include smoothing to reduce the noise. Generally, edge detection methods may be grouped in two categories, gradient and Laplacian. Gradient methods use the maximum and minimum in the first derivative of the image to detect edges and compute the gradient magnitude horizontally and vertically. Sobel, Canny, Prewitt, and Roberts operators are suitable examples of gradient methods that may be used in this disclosure. Laplacian methods may search for zero crossings in the second derivative of the image to find edges. Marrs-Hildreth is a suitable example of a Laplacian method that may be used in this disclosure.

In one aspect, a line may be considered a connected group of aligned edge pixels. The line detection process may be performed using local approaches or global ones, as the well-known Hough Transform noted above. Line detection generally may occur after edge detection. The image may be subdivided into smaller blocks for analysis to determine whether a line segment is present. Different statistical methods may be applied with created statistical models of line segments, including a PCA based technique that may be used to transfer an edge image in a parameter space.

In one aspect, corners also represent a feature that may be recognized using image analysis techniques. A corner may be considered a point for which there are two dominant and different edge directions in the vicinity of the point, created for example by an intersection of two or more edges where an edge is a sharp change in image brightness. Corner detection is a methodology used within computer vision systems to obtain certain kinds of features from a given image and many suitable approaches may be used. One strategy involves obtaining partial derivatives to construct an autocorrelation matrix. Depending on the chosen implementation, shifts in discrete 45° angles may be identified or all directions may be considered. Preprocessing to reduce noise may facilitate corner detection.

In one aspect, detection of circular shapes may be used in the determination of whether the user is operating the moving vehicle, as many objects have a circle component, including a face, a head and a steering wheel. Given that portable device 200 may be in different orientations relative to the object being recognized circular objects may have a different shape, such as an ellipse. Within the context of this disclosure, an ellipse may be considered a type of circular shape. Circles and ellipses may be detected using the width vs height ratio. Similar pixels in the area may be counted and iteratively connected to adjacent foreground pixels to define the area. This information about the area may be used to determine width and height information. By using a geometric model for a circle or ellipse with the width and height information may be used in identifying the shape of the area.

In one aspect, recognition of the user of portable device may include detecting features corresponding to the user's face, head and/or shoulders. For example, face detection may include separating face areas from non-face background regions. Applying a face detection operation may involve segmentation, feature extraction, and facial features verification. Extraction of the face from the background, particularly if the background is relatively complex, may involve detecting local facial features using a low level feature extraction algorithm and subsequent classification using statistical models of representative human faces. Other methods that may be employed include artificial intelligence techniques for detecting face in image. Yet another set of methods may use several correlation templates to detect local sub-features known as Eigen-faces. A combination of all or some of these methods may be fused to perform face detection. As a further example, a face may be detected using the skin color feature and the height vs width ratio. The area with skin color property may be determined such that the ratio and its width and height parameters are then calculated using maximum and minimum coordinates. Then, the ratio of the width may be determined as in the ellipse detection technique described above. Additional facial features, such as eyes, eye-brows, lips, nose, and mouth may also be used when detecting a human face.

A related object that may be recognized is the head of the user. Often, the head may be identified in a relatively straightforward manner if the face is visible. However, if the image only contains a partial representation of the face, such as a side view, a color feature may be used when detecting the user's head. The head may be considered as an object that has a skin color area with a black color area combination. Also, recognition of features such as ears may help in the human head detection.

With respect to recognition of a user's shoulders, this feature may be considered a relatively horizontal line below the head. Generally, the human top shoulder portion is the most unvarying part of the human body, so it may represent a key feature in the recognition process. For example, a combination of head and shoulders may be used to identify the presence of the user in the image to help account for the potential variation in head shape due to factors such as differing hair styles.

In one aspect, the determination of whether the user is operating the moving vehicle may include detecting objects that are associated with the vehicle, such as a steering wheel, a side view mirror, a rear view mirror, a seat belt, a roof, a windshield, a side window and others. For example, a steering wheel may be detected using the circle/ellipse recognition techniques discussed above. The steering wheel may have a circular shape with some lines inside the circle or may have an elliptical shape due to the relative orientation of portable device 200. Further, one or more mirrors may be detected as an elliptical shape having appropriate dimensions. On the other hand, a seat belt may be considered a thick line with a slope that may be detected using the line and/or edge detection techniques. Similarly, a roof, side window and/or windshield may be recognized using an appropriate combination of line, edge and/or corner detections.

Any combination of the above object and feature extraction and recognition techniques may be used by detector 220 when determining whether the user is operating the moving vehicle. Further, the techniques may be applied to a single mage captured from image sensor 222 or any desired sequence of images. The different techniques may provide a vehicle operator determination in a sequential manner or in parallel. Further, when multiple techniques are applied, each may provide a result having a varying degree of confidence. The degree of confidence may be based, for example, on the quality of the information in the corresponding image, including recognizing a complete object being given more weight than a partial recognition. As another example, detection of a defined combination of objects, such as a head and shoulders as described above, may also be accorded more weight. Still further, detection of certain objects may be given more weight than detection of other objects. The following are representative objects and features that may be detected and contribute, in any desired combination, to the determination of whether the user of portable device 200 is operating the moving vehicle:

Head, face and/or shoulders; may be detected in an image to indicate the user is relatively close to the phone.

Figure 13:
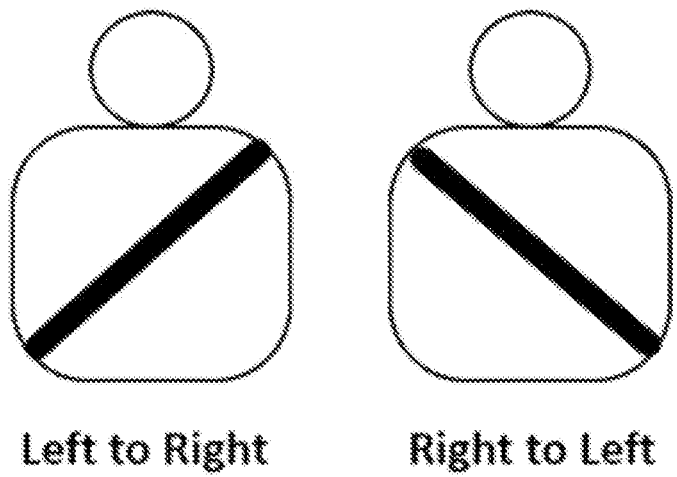
FIG. 13 schematically depicts varying potential orientations of a seat belt with respect to a vehicle operator.

Seat belt; may be detected as a thick line with a slope. The relative orientation of this shoulder portion of the seat belt varies depending on whether it is being worn by the operator or a passenger. As shown in FIG. 13, the seat belt may run from left to right when the operator is located on the left side of the vehicle and may run from right to left when the operator is located on the right side of the vehicle.

Steering wheel; may be detected as a circle or ellipse with relatively large diameters.

Side and/or rear view mirror; may be detected as an ellipse with a relatively small diameter. Further, the rear view mirror may be detected based on a location in the middle of the windshield can be detected. The relative orientation of either the side or rear view mirrors may be used to provide an indication of whether portable device is located on the right or left side of the vehicle, and correspondingly whether the user of the portable device is more likely to be the operator or the passenger.

Windshield, side window and/or roof; may be detected as horizontal or vertical lines or edges. The relative orientation of these features may also be used to provide an indication of whether portable device is located on the right or left side of the vehicle.

As an illustration, Table 1 lists possible combinations of the steering wheel and other features and Table 2 lists possible combinations of the user's face, head, and/or shoulders and other features. Either of these possible combination may be detected when determining whether the user of portable device 200 is operating the moving vehicle.

TABLE 1

| Steering Wheel | Side view mirror (right or left) |
| --- | --- |
| | One hand or two hand on the steering wheel |
| | Windshield line (right or left) |
| | Rear view mirror |

TABLE 2

| Face, Head, Shoulders | Side view mirror (right or left) |
| --- | --- |
| | Windshield line (right or left) |
| | Seat belt (different directions) |
| | Window line (right or left) |
| | Roof line (right or left) |

Figure 14:
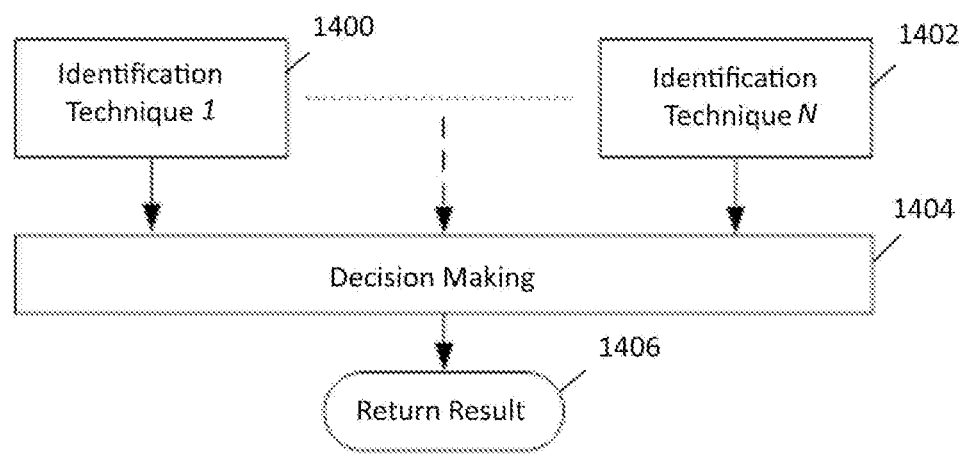
FIG. 14 is a flowchart showing a routine for integrating multiple identification techniques for determining whether the user is operating the moving vehicle according to an embodiment.

The above materials describe a number of approaches for using objects and features recognized in a captured image to determine whether the user is operating the moving vehicle. In one aspect, multiple techniques may be employed and fused to improve the accuracy of the determination as schematically indicated in FIG. 14. As shown, a plurality of identification techniques may be applied, including identification technique I 1400 through identification technique N 1402. The output of each is fed to a decision making block in 1404. The result is returned in 1406 represents an integration of each identification technique. When the output of only one identification technique is available, it may be used as the determination of whether the user is operating the moving vehicle. However, when multiple outputs are available, they may be merged to provide a result influenced by each identification technique. As noted, the identification techniques may be performed sequentially or in parallel.

In one aspect, a voting technique may be used to integrate the outputs of the identification techniques. For example, a simple majority may be employed to make the determination based on the number of identification techniques returning the same output. This approach is straightforward to implement and requires minimal resources. Effectively, each identification technique is afforded equal weight. Alternatively, different weights may be assigned to the identification techniques, which may be based on the associated confidence as described above. Each identification technique may be given a weight proportional to its priority. A further modification is that the weighting accorded to each identification technique may be adjusted depending on context. The same identification technique may have a relatively greater weight in one situation and a relatively lesser weight in another situation. The assignment of weight ratio may depend on the quality of the information provided to or derived by the technique. For example, if the steering wheel object based technique has a complete shape of the steering wheel it may be accorded greater weight than if only a partial steering wheel shape is detected.

Suitable manners for determining whether the user is operating the moving vehicle in scenarios corresponding to FIG. 13 and FIGS. 15-18, which are graphical representation of preprocessed captured images that may be used for object and feature extraction and recognition.

In a first scenario, direction of the seat belt line may either be from left-up to right-down or from right-up to left-down as shown in HG, 13 and may be used to distinguish whether the user is the operator or a passenger. As noted, the direction of the seat belt line and the decision are related to the country where portable device 200 is being used. For example, in locations that have the steering wheel on the left side of the car, the operator will have the seat belt direction from left-up to right-down and for the passenger, the direction will be from right-up to left-down. Conversely, in locations that have the steering wheel on the right side of the car, the orientations will be reversed. Further, a combination of seat belt direction and human face, head, and/or shoulders detection may give a clear determination about whether the user is the operator.

Figure 15:
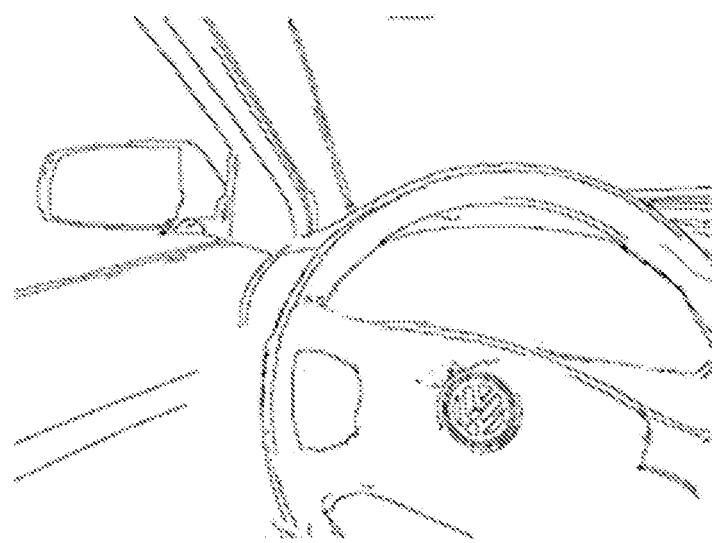
FIG. 15 is a graphical representation of a preprocessed image in which objects associated with the vehicle may be recognized when the user is a passenger according to an embodiment.
Figure 16:
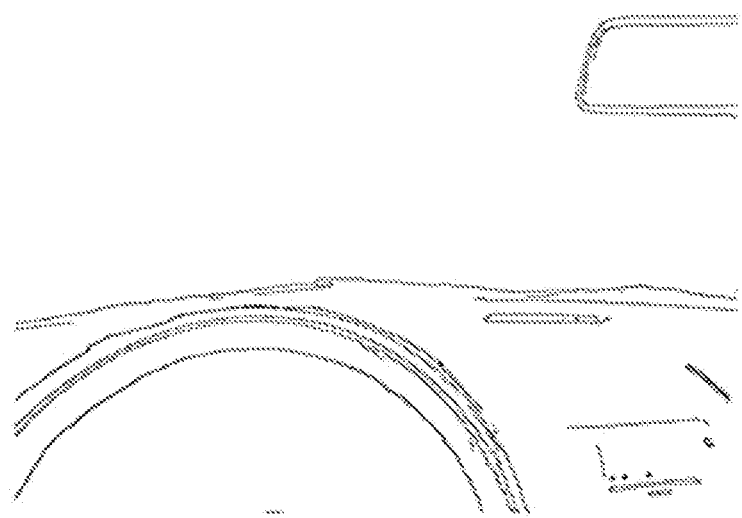
FIG. 16 is a graphical representation of one preprocessed image in which objects associated with the vehicle may be recognized when the user is the operator according to an embodiment.

In a second scenario, a steering wheel being detected in the image as shown in FIG. 15 may, on its own, indicate that the user is the operator. However, different aspects and ratios of the steering wheel size may be used in refining the determination. For example, if the steering wheel in the image appears to be very close to portable device 200, there may be a high probability that the user is the operator. Conversely, a detected steering wheel having a relatively small size and being further from portable device 200 indicate the user is a passenger. Other objects in the image such as side view mirrors, rear view mirror, and/or windshield lines can support the determination as shown in FIGS. 15 and 16. Whether these objects are located in the captured images, and whether they are oriented on the left or right, together with the expected position of a vehicle operator, may be used when determining whether the user is the operator. Further, a combination of steering wheel and windshield lines may give different results based on the geometric shape of the detected objects or their proportion and depth. For example, with the expected position of a left side steering wheel, an intersection between the steering wheel and the left side of the windshield may indicate the user is the operator while detecting the steering wheel and left side of the windshield as separate objects may indicate the user is a passenger. Similarly, the proportion and the depth can give information if the objects are closer to portable device 200 or further away. Moreover, detecting a human hand on the steering wheel may help the determination. If the user is the operator, it may be expected that only one hand will be detected on the steering wheel given the determination in 106 that portable device 200 is being held in hand. Conversely, detection of two hands on the steering wheel may indicate the user is a passenger.

Figure 17:
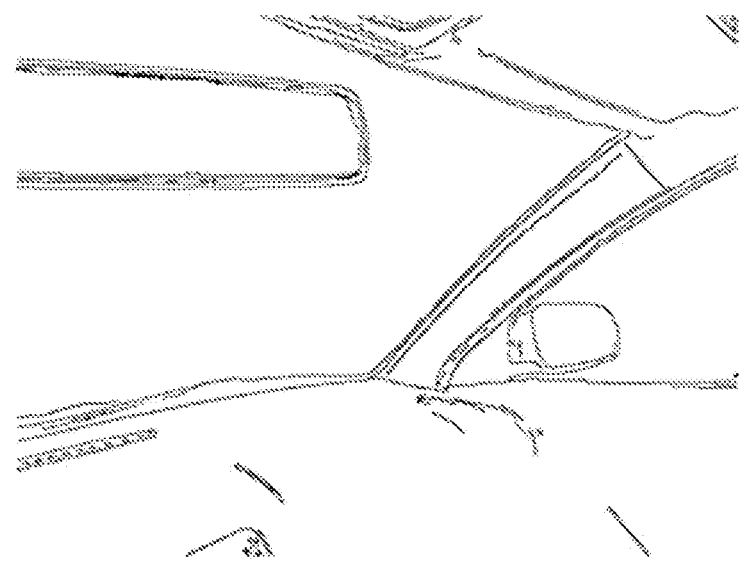
FIG. 17 is a graphical representation of another preprocessed image in which objects associated with the vehicle may be recognized when the user is the operator according to an embodiment.

In a third scenario, the determination may be made based on a combination of windshield line and rear view mirror, or partial detections of these objects. Although left or right windshield lines may appear relatively similar whether the user is the operator or a passenger, the orientation of the rear view mirror may be used to distinguish the operator. The relative orientations for these objects when the user is the operator is shown in FIG. 17.

Figure 18:
FIG. 18 is a graphical representation of a preprocessed image in which objects associated with the vehicle and the user may be recognized when the user is the operator according to an embodiment.

In a fourth scenario, detection of a face, head, and/or shoulders, fully or partially, may give indication that the user is in the captured image. Such information alone may not be sufficient to indicate whether the user is the operator or a passenger. Other detected object(s) in the image can help distinguish these possibilities. For example, a side view mirror, together with the expected positioning of a vehicle operator, may be used when determining whether the user is the operator. Similarly, the windshield lines at left and right side also be used. Still further, detecting a human face, head, and/or shoulders with the vehicle's window Of roof lines may be used to determine the user is the operator as shown in FIG. 18.

In addition or alternative to the image based techniques for determining whether the user is the operator, other sources of information may be used as desired. For example, such information may be used to indicate whether the user is relatively close to the vehicle dashboard or relatively further away. Correspondingly, this can determine whether the user is sitting in the front seat or at the rear seat, such that if the user is determined to be in the rear seat, it is unlikely the user is the operator. For example, portable device 200 may have the capability of forming a wireless connection with the vehicle. Notably, a wireless communication technology such as Bluetooth™ may allow data sharing within a certain range, for providing hand-free calling functionality or audio streaming. As such, a transmitter in the dashboard may send a signal to be received by portable device 200. The strength of the received signal may be used to determine the relative distance between the portable device (and correspondingly, the user) and the dashboard. As another example, the vehicle may have an audio system featuring multiple speakers, with known balance and fade. By analyzing the sound waves reaching portable device 200 using its microphone, a triangulation technique may be used to estimate the location of portable device 200 inside the vehicle. As will be appreciated, this may provide information about the relative location of portable device, both from front to rear and from left to right.

CONTEMPLATED EMBODIMENTS

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation Of interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence) or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone lowers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different levels of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device (s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for user and moving vehicle detection, the method comprising:
    obtaining sensor data for a portable device from sensors integrated with the portable device, including at least one motion sensor configured to output data representing motion of the portable device;
    performing an ordered sequence of determinations to improve resource conservation, wherein each determination is performed only if an immediately previous determination is confirmed, by:
        a) processing motion sensor data obtained from only the portable device to determine whether the portable device is in a moving vehicle;
        b) processing motion sensor data obtained from only the portable device to determine whether the portable device is connected to a user if the portable device is determined to be in the moving vehicle; and
        c) processing motion sensor data to determine whether the portable device is hand held if it is determined the portable device is connected to the user, wherein processing the motion sensor data to determine whether the portable device is hand held comprises at least one of:
            i) determining a device use case for the portable device by processing the motion sensor data;
            ii) applying a machine learning technique to the motion sensor data; and
            iii) applying a signal analysis technique to the motion sensor data.

2. The method of claim 1, wherein processing motion sensor data to determine whether the portable device is in a moving vehicle comprises applying a machine learning technique.

3. The method of claim 2, further comprising inputting features extracted from the processed motion sensor data to at least one stored classification model to determine a motion mode of the portable device.

4. The method of claim 3, wherein the at least one stored classification model comprises extracted features developed during a training phase.

5. The method of claim 1, wherein processing motion sensor data to determine whether the portable device is in a moving vehicle comprises applying a signal analysis technique.

6. The method of claim 5, wherein the signal analysis technique comprises any one or any combination of the following: (i) a statistical analysis; (ii) a frequency-domain analysis; or (iii) a time-domain analysis.

7. The method of claim 5, wherein the signal analysis technique comprises an analysis of at least one signal selected from the group consisting of an angular rotation signal, a signal derived from the angular rotation signal, an acceleration signal, and a signal derived from the acceleration signal.

8. The method of claim 1, wherein the processing motion sensor data to determine whether the portable device is in a moving vehicle is based at least in part on motion sensor data that comprises inertial sensor data.

9. The method of claim 8, further comprising obtaining supplemental sensor data for the portable device and processing the supplemental sensor data with the inertial sensor data.

10. The method of claim 1, further comprising obtaining absolute navigational information for the portable device, wherein determining whether the portable device is in a moving vehicle is based at least in part on the absolute navigational information.

11. The method of claim 1, wherein processing motion sensor data to determine whether the portable device is connected to the user comprises applying a machine learning technique.

12. The method of claim 11, further comprising inputting features extracted from processed motion sensor data to at least one stored classification model to characterize if the portable device is connected to the user.

13. The method of claim 12, wherein the at least one stored classification model comprises extracted features developed during a training phase.

14. The method of claim 1, wherein processing motion sensor data to determine whether the portable device is connected to the user comprises applying a signal analysis technique.

15. The method of claim 14, wherein the signal analysis technique comprises any one or any combination of the following: (i) a statistical analysis; (ii) a frequency-domain analysis; or (iii) a time-domain analysis.

16. The method of claim 14, wherein the signal analysis technique comprises an analysis of at least one signal selected from the group consisting of an angular rotation signal, a signal derived from the angular rotation signal, an acceleration signal, and a signal derived from the acceleration signal.

17. The method of claim 1, wherein determining whether the portable device is hand held comprises determining a device use case for the portable device.

18. The method of claim 1, wherein processing the sensor data to determine whether the portable device is hand held comprises applying a machine learning technique.

19. The method of claim 18, further comprising inputting features extracted from the processed sensor data to at least one stored classification model to determine whether the portable device is hand held.

20. The method of claim 19, wherein the at least one stored classification model comprises extracted features developed during a training phase.

21. The method of claim 1, wherein processing the sensor data to determine whether the portable device is hand held comprises applying a signal analysis technique.

22. The method of claim 21, wherein the signal analysis technique comprises any one or any combination of the following: (i) a statistical analysis; (ii) a frequency-domain analysis; or (iii) a time-domain analysis.

23. The method of claim 21, wherein the signal analysis technique comprises an analysis of at least one signal selected from the group consisting of an angular rotation signal, a signal derived from the angular rotation signal, an acceleration signal, and a signal derived from the acceleration signal.

24. The method of claim 1, wherein the processing motion sensor data to determine whether the portable device is hand held is based at least in part on motion sensor data that comprises inertial sensor data.

25. The method of claim 24, further comprising obtaining supplemental sensor data, wherein the determination of whether the portable device is hand held is further based at least in part on the supplemental sensor data.

26. The method of claim 25, wherein the supplemental sensor data is obtained from at least one of an ambient light sensor and a proximity sensor.

27. The method of claim 25, further comprising activating a source of the supplemental sensor data from a power save mode if it is determined the portable device is connected to the user.

28. The method of claim 1, further comprising obtaining information regarding the portable device, wherein the determination of whether the portable device is hand held is further based at least in part on the information regarding the portable device.

29. The method of claim 28, wherein the information regarding the portable device comprises a status of at least one application running on the portable device.

30. The method of claim 1, further comprising obtaining image sensor data for the portable device if it is determined the portable device is hand held, processing the image sensor data, and determining whether the user of the portable device is operating the moving vehicle based at least in part on the processed image sensor data.

31. The method of claim 30, wherein processing the image sensor data comprises extracting at least one of a feature and an object from the image sensor data.

32. The method of claim 31, further comprising preprocessing the image sensor data before extracting the at least one of a feature and an object.

33. The method of claim 32, wherein preprocessing the image comprises performing an operation selected from the group consisting of generating a full color image, generating a reduced dimension image, generating a grey scale image, generating a resized image, generating a normalized image, and generating a reduced noise image.

34. The method of claim 31, wherein extracting the at least one of a feature and an object comprises a line detection operation.

35. The method of claim 31, wherein extracting the at least one of a feature and an object comprises an edge detection operation.

36. The method of claim 31, wherein extracting the at least one of a feature and an object comprises a circular shape detection operation.

37. The method of claim 31, wherein extracting the at least one of a feature and an object comprises performing a Hough transform.

38. The method of claim 31, wherein processing the image sensor data further comprises recognizing the at least one of a feature and an object.

39. The method of claim 38, wherein the at least one of a feature and an object comprises an object associated with the user.

40. The method of claim 39, wherein the object associated with the user is at least one of a head, a face and shoulders.

41. The method of claim 38, wherein the at least one of a feature and an object comprises an object associated with the vehicle.

42. The method of claim 41, wherein the object associated with the vehicle is at least one of a steering wheel, a mirror, a seat belt, a windshield and a window.

43. The method of claim 38, further comprising recognizing a combination of objects associated with the user and the vehicle.

44. The method of claim 30, wherein obtaining image sensor data further comprises activating an image sensor of the portable device from a power save mode.

45. The method of claim 30, wherein image sensor data is obtained from multiple image sensors of the portable device.

46. The method of claim 30, further comprising obtaining a coarse location for the portable device and determining an expected orientation of a vehicle operator with respect to the vehicle based on the coarse location, wherein determining whether the user of the portable device is operating the moving vehicle is based at least in part on the expected vehicle operator orientation.

47. The method of claim 46, wherein the coarse location is obtained from any one or any combination of the following: (i) a global navigation satellite system (GNSS); (ii) cell-based positioning; (iii) WiFi-based positioning; or (iv) other wireless -based positioning.

48. The method of claim 1, wherein the processing motion sensor data to determine whether the portable device is connected is based at least in part on motion sensor data that comprises inertial sensor data.

49. A portable device for providing user and moving vehicle detection, the portable device comprising:
a sensor assembly integrated with the portable device, including at least one motion sensor configured to output data representing motion of the portable device;
a processor configured to receive and process sensor data for the portable device from sensors integrated with the portable device; and
a detector configured to perform an ordered sequence of determinations to improve resource conservation, wherein each determination is performed only when an immediately previous determination is confirmed, by:
  a) processing motion sensor data obtained from only the portable device to determine whether the portable device is in a moving vehicle;
  b) processing motion sensor data obtained from only the portable device to determine whether the portable device is connected to a user if it is determined that the portable device is in the moving vehicle; and
  c) processing motion sensor data to determine whether the portable device is hand held if it is determined the portable device is connected to the user, wherein the detector is configured to process the motion sensor data to determine whether the portable device is hand held by at least one of:
    i) determining a device use case for the portable device by processing the motion sensor data;
    ii) applying a machine learning technique to the motion sensor data; and
    iii) applying a signal analysis technique to the motion sensor data.

50. The portable device of claim 49, wherein the sensor assembly comprises an inertial sensor.

51. The portable device of claim 50, further comprising a supplemental sensor selected from the group consisting of an ambient light sensor and a proximity sensor, wherein the detector is further configured to determine whether the portable device is hand held based at least in part on output from the supplemental sensor.

52. The portable device of claim 49, further comprising an image sensor, wherein the detector is further configured to process image sensor data to determine whether the user of the portable device is operating the moving vehicle.

53. The portable device of claim 52, further comprising a location module configured to obtain a coarse location for the portable device, wherein the detector is further configured to determine whether the user of the portable device is operating the moving vehicle based at least in part an expected orientation of a vehicle operator with respect to the vehicle based on the coarse location.

54. The portable device of claim 53, wherein the location module comprises a source of absolute navigational information from any one or any combination of the following: (i) a global navigation satellite system (GNSS) receiver; (ii) cell-based positioning receiver; (iii) WiFi-based positioning receiver; or (iv) other wireless-based positioning receiver.

55. The portable device of claim 49, wherein the sensor assembly includes an accelerometer and a gyroscope.

56. The device of claim 55, wherein the sensor assembly comprises an inertial sensor implemented as a Micro Electro Mechanical System (MEMS).

57. The method of claim 48, further comprising obtaining supplemental sensor data, wherein the determination of whether the portable device is connected is further based at least in part on the supplemental sensor data.

* * * * *